United States Patent
Kang et al.

(10) Patent No.: US 12,491,696 B2
(45) Date of Patent: Dec. 9, 2025

(54) COVER WINDOW, DISPLAY DEVICE INCLUDING THE SAME, AND APPARATUS FOR MANUFACTURING THE DISPLAY DEVICE

(71) Applicant: Samsung Display Co., Ltd., Yongin-si (KR)

(72) Inventors: Byunghoon Kang, Yongin-si (KR); Seung Kim, Yongin-si (KR); Seungho Kim, Yongin-si (KR); Gyuin Shim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 889 days.

(21) Appl. No.: 17/499,213

(22) Filed: Oct. 12, 2021

(65) Prior Publication Data

US 2022/0223820 A1 Jul. 14, 2022

(30) Foreign Application Priority Data

Jan. 11, 2021 (KR) .......................... 10-2021-0003563

(51) Int. Cl.
*B32B 3/02* (2006.01)

(52) U.S. Cl.
CPC ............ *B32B 3/02* (2013.01); *B32B 2457/20* (2013.01)

(58) Field of Classification Search
CPC ................................ B32B 3/02; B32B 2457/20
USPC ........................................................ 428/192
See application file for complete search history.

(56) References Cited

U.S. PATENT DOCUMENTS

| | | | |
|---|---|---|---|
| 9,242,889 B2 | 1/2016 | Yamakaji et al. | |
| 9,507,192 B2 | 11/2016 | Lim et al. | |
| 10,453,710 B2 | 10/2019 | Kim | |
| 10,638,619 B2 | 4/2020 | Seo et al. | |
| 10,712,848 B2 | 7/2020 | Shim et al. | |
| 11,657,736 B2 | 5/2023 | Ahn et al. | |
| 2018/0056638 A1* | 3/2018 | Choi | B32B 38/1808 |
| 2018/0358270 A1* | 12/2018 | Julien | H01L 21/306 |
| 2021/0016538 A1 | 1/2021 | Kwon et al. | |
| 2022/0223820 A1* | 7/2022 | Kang | B32B 3/02 |

FOREIGN PATENT DOCUMENTS

| | | |
|---|---|---|
| KR | 10-1267117 | 5/2013 |
| KR | 10-2016-0087984 | 7/2016 |
| KR | 10-2018-0137644 | 12/2018 |
| KR | 10-1991839 | 6/2019 |
| KR | 10-2019-0127161 | 11/2019 |
| KR | 10-2020-0058638 | 5/2020 |

(Continued)

*Primary Examiner* — Betelhem Shewareged
(74) *Attorney, Agent, or Firm* — Sughrue Mion, PLLC

(57) ABSTRACT

A cover window includes a front portion including a flat surface; a first side portion extending from a first edge of the front portion and being bent about a first axis that is parallel to the first edge of the front portion; a second side portion extending from a second edge crossing the first edge of the front portion and being bent about a second axis that is parallel to the second edge of the front portion; and a corner portion between the first side portion to the second side portion, wherein the first side portion includes an outer surface and an inner surface opposite to the outer surface, and a curvature radius of the outer surface is different from a curvature radius of the inner surface.

12 Claims, 12 Drawing Sheets

(56) References Cited

FOREIGN PATENT DOCUMENTS

| KR | 10-2126863 | 6/2020 |
|----|------------|--------|
| WO | 2015/064978 | 5/2015 |
| WO | 2015/199261 | 12/2015 |

* cited by examiner

COVER WINDOW, DISPLAY DEVICE INCLUDING THE SAME, AND APPARATUS FOR MANUFACTURING THE DISPLAY DEVICE

CROSS-REFERENCE TO RELATED APPLICATION(S)

This application claims priority to and benefits of Korean Patent Application No. 10-2021-0003563 under 35 U.S.C. § 119, filed on Jan. 11, 2021, in the Korean Intellectual Property Office, the entire contents of which are incorporated herein by reference.

BACKGROUND

1. Technical Field

One or more embodiments relate to a cover window, a display device including the cover window, and an apparatus for manufacturing the display device.

2. Description of the Related Art

Recently, electronic devices based on mobility have been widely used. As portable electronic devices, tablet PCs, as well as small-sized electronic devices such as mobile phones, have been widely used recently.

Such a portable electronic device may include a display device that supports various functions and that provides a user with visual information such as images or videos. Recently, as sizes of components for driving a display device have been reduced, the relevance of the display device in an electronic device has gradually increased, and research for expanding a display area of the display device providing images or videos has been actively performed.

A display device may include a cover window for protecting a display panel of the display device. The cover window is at an outermost part of the display device and may be in direct contact with a user.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

One or more embodiments provide a cover window for providing a user with an excellent grip sense in case that the user contacts a display device, a display device including the cover window, and an apparatus for manufacturing the display device.

Also, in case that a display area of a display panel may include a curved surface that is curved in various directions and/or with various radii of curvature, one or more embodiments provide a cover window with which stress applied to the display panel is reduced in case that the cover window is attached to the display panel and damage to the display panel is reduced, a display device including the cover window, and an apparatus for manufacturing the display device.

However, the above technical features are examples, and the scope of the disclosure is not limited thereto.

Additional aspects will be set forth in part in the description which follows and, in part, will be apparent from the description, or may be learned by practice of the presented embodiments of the disclosure.

According to an embodiment, a cover window may include a front portion including a flat surface; a first side portion extending from a first edge of the front portion, the first side portion being bent about a first axis that is parallel to the first edge of the front portion, a second side portion extending from a second edge crossing the first edge of the front portion, the second side portion being bent about a second axis that is parallel to the second edge of the front portion, and a corner portion between the first side portion to the second side portion, wherein the first side portion may include an outer surface and an inner surface opposite to the outer surface, and a curvature radius of the outer surface may be different from a curvature radius of the inner surface.

The curvature radius of the outer surface of the first side portion may be less than the curvature radius of the inner surface of the first side portion.

A thickness of the first side portion may vary in a direction away from the first edge of the front portion.

The thickness of the first side portion may be gradually increased and reduced in the direction away from the first edge of the front portion.

A maximum thickness of the first side portion may be greater than a thickness of the front portion.

An extending length of the first edge of the front portion and an extending length of the second edge of the front portion may be different from each other.

According to an embodiment, a display device may include a display panel including a display area including light-emitting devices, and a cover window disposed on the display panel, wherein the cover window may include a front portion including a flat surface; a first side portion extending from a first edge of the front portion, the first side portion being bent about a first axis that is parallel to the first edge of the front portion; a second side portion extending from a second edge crossing the first edge of the front portion, the second side portion being bent about a second axis that is parallel to the second edge of the front portion; and a corner portion between the first side portion to the second side portion, the first side portion and the second side portion of the cover window each may include an inner surface facing the display panel and an outer surface opposite to the inner surface, and a curvature radius of the outer surface of each of the first side portion and the second side portion may be different from a curvature radius of the inner surface of each of the first side portion and the second side portion.

The curvature radius of the outer surface of each of the first side portion and the second side portion may be less than the curvature radius of the inner surface of each of the first side portion and the second side portion.

The display panel may include a front display area corresponding to the front portion of the cover window; a first side display area and a second side display area respectively corresponding to the first side portion and the second side portion of the cover window; and a corner display area corresponding to the corner portion of the cover window.

The display panel may include a first portion bent along the inner surface of the first side portion of the cover window, and a second portion bent along the inner surface of the second side portion of the cover window.

A surface of the first portion in the display panel may have a curvature radius same as the curvature radius of the inner surface of the first side portion in the cover window, and a surface of the second portion in the display panel may have a curvature radius same as the curvature radius of the inner surface of the second side portion in the cover window.

A thickness of the first side portion may vary in a direction away from the first edge of the front portion.

The thickness of the first side portion may be gradually increased and reduced in the direction away from the first edge of the front portion.

A maximum thickness of the first side portion in the cover window may be greater than a thickness of the front portion.

According to an embodiment, a display device may include a display panel including a display area including light-emitting devices; and a cover window disposed on the display panel, wherein the cover window may include a front portion including a flat surface; a first side portion extending from a first edge of the front portion, the first side portion being bent about a first axis that is parallel to the first edge of the front portion; a second side portion extending from a second edge crossing the first edge of the front portion, the second side portion being bent about a second axis that is parallel to the second edge of the front portion; and a corner portion between the first side portion to the second side portion, a thickness of the first side portion of the cover window may vary in a direction away from the first edge of the front portion, and a thickness of the second side portion of the cover window may vary in a direction away from the second edge of the front portion.

The thickness of the first side portion of the cover window may be gradually increased and reduced in the direction away from the first edge of the front portion, and the thickness of the second side portion of the cover window may be gradually increased and reduced in the direction away from the second edge of the front portion.

A maximum thickness of each of the first side portion and the second side portion in the cover window may be greater than a thickness of the front portion.

According to an embodiment, an apparatus for manufacturing a display device may include a first mold including a support surface on which a cover window is disposed; and a second mold including a pressing surface that presses an upper surface of the cover window, the second mold facing the first mold, wherein the support surface of the first mold may include a flat support surface having a flat surface encompassed by a first direction and a second direction crossing the first direction; a first curved support surface extending from a first edge of the flat support surface and having a first curvature radius; a second curved support surface extending from a second edge crossing the first edge of the flat support surface, and having a second curvature radius; and a corner support surface between the first curved support surface and the second curved support surface to each other, the pressing surface of the second mold may include a flat pressing surface corresponding to the flat support surface and having a flat surface that is parallel to the flat support surface; a first curved pressing surface corresponding to the first curved support surface, and having a third curvature radius that is different from the first curvature radius of the first curved support surface; a second curved pressing surface corresponding to the second curved support surface, and having a fourth curvature radius that is different from the second curvature radius of the second curved support surface; and a corner pressing surface between the first curved pressing surface and the second curved pressing surface to each other.

The first curvature radius of the first curved support surface of the first mold may be greater than the third curvature radius of the first curved pressing surface of the second mold, and the second curvature radius of the second curved support surface of the first mold may be greater than the fourth curvature radius of the second curved pressing surface of the second mold.

A first distance between the first curved pressing surface of the second mold and the first curved support surface of the first mold may be greater than a second distance between the flat pressing surface of the second mold and the flat support surface of the first mold when the pressing surface of the second mold presses the cover window.

The first distance may vary in a direction away from the first edge of the flat support surface.

The first distance may be gradually increased and reduced in the direction away from the first edge of the flat support surface.

The apparatus may further include a moving portion that moves the second mold in a third direction crossing the first direction and the second direction.

Other aspects, features and advantages of the disclosure will become better understood through the accompanying drawings, the claims and the detailed description.

Such general aspects of the disclosure may be performed using systems, methods, computer-readable storage mediums, and/or combinations thereof.

BRIEF DESCRIPTION OF THE DRAWINGS

The above and other aspects, features, and advantages of embodiments of the disclosure will be more apparent from the following description taken in conjunction with the accompanying drawings, in which.

DETAILED DESCRIPTION OF THE EMBODIMENTS

Figure 1:
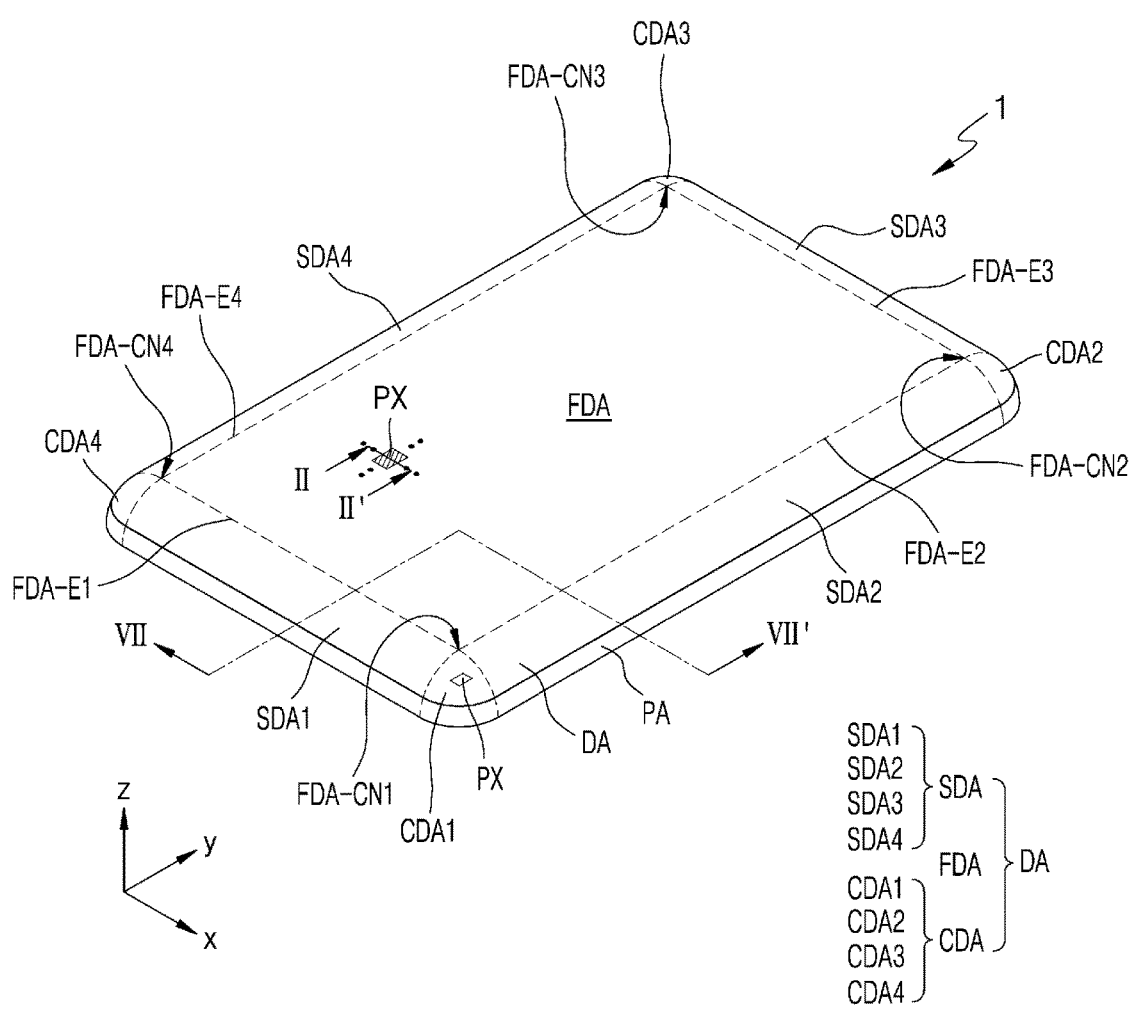
FIG. 1 is a schematic perspective view of a display device according to an embodiment.

Reference will now be made in detail to embodiments, examples of which are illustrated in the accompanying drawings, wherein like reference numerals refer to like elements throughout. In this regard, the embodiments may have different forms and should not be construed as being limited to the descriptions set forth herein. Accordingly, the embodiments are merely described below, by referring to the figures, to explain aspects of the description.

Throughout the disclosure, the phrase "at least one of" is intended to include the meaning of "at least one selected from the group of" for the purpose of its meaning and interpretation. For example, the expression "at least one of a, b or c" indicates only a, only b, only c, both a and b, both a and c, both b and c, all of a, b, and c, or variations thereof.

In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

As the disclosure allows for various changes and numerous embodiments, embodiments will be illustrated in the drawings and described in detail in the written description. The attached drawings for illustrating one or more embodiments are referred to in order to gain a sufficient understanding, the merits thereof, and the objectives accomplished by the implementation. However, the embodiments may have different forms and should not be construed as being limited to the descriptions set forth herein.

The embodiments will be described below in more detail with reference to the accompanying drawings. Those components that are the same or are in correspondence may be referred to by the same reference numeral regardless of the figure number, and redundant explanations may be omitted.

While such terms as "first," "second," etc., may be used to describe various components, such components are not be limited to the above terms. The above terms are used only to distinguish one component from another. For example, a first component may be referred to as a second component, and similarly, a second component may be referred to as a first component without departing from the scope of the disclosure.

An expression used in the singular encompasses the expression of the plural, unless it has a clearly different meaning in the context.

In the specification, it is to be understood that the terms "including," "having," and "comprising" and variations thereof are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

The phrase "in a plan view" means viewing the object from the top, and the phrase "in a schematic cross-sectional view" means viewing a cross-section of which the object is vertically cut from the side.

It will be understood that when a layer, region, or component is referred to as being "formed on" another layer, region, or component, it may be directly or indirectly formed on the other layer, region, or component. For example, intervening layers, regions, or components may be present.

The spatially relative terms "below", "beneath", "lower", "above", "upper", or the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in other directions and thus the spatially relative terms may be interpreted differently depending on the orientations.

The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art.

When an element is described as 'not overlapping' or 'to not overlap' another element, this may include that the elements are spaced apart from each other, offset from each other, or set aside from each other or any other suitable term as would be appreciated and understood by those of ordinary skill in the art.

The terms "face" and "facing" mean that a first element may directly or indirectly oppose a second element. In a case in which a third element intervenes between the first and second element, the first and second element may be understood as being indirectly opposed to one another, although still facing each other.

Sizes of components in the drawings may be exaggerated for convenience of explanation. In other words, since sizes and thicknesses of components in the drawings are arbitrarily illustrated for convenience of explanation, the following embodiments are not limited thereto.

When an embodiment may be implemented differently, a specific process order may be performed differently from the described order. For example, two consecutively described processes may be performed substantially at the same time or performed in an order opposite to the described order.

In the embodiments below, when layers, areas, or elements or the like are referred to as being "connected," it will be understood that they may be directly connected or an intervening portion may be present between layers, areas or elements. For example, when layers, areas, or elements or the like are referred to as being "electrically connected," they may be directly electrically connected, or layers, areas or elements may be indirectly electrically connected and an intervening portion may be present.

The x-axis, the y-axis and the z-axis are not limited to three axes of the rectangular coordinate system, and may be interpreted in a broader sense. For example, the x-axis, the y-axis, and the z-axis may be perpendicular to one another, or may represent different directions that are not perpendicular to one another.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which the disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a perspective view of a display device 1 according to an embodiment.

Referring to FIG. 1, the display device 1 may have a substantially rectangular shape in a plan view. In an embodiment, the display device 1 may have various shapes such as a substantially polygonal shape, for example, a substantially triangular shape, a substantially rectangular shape, etc., a substantially circular shape, a substantially elliptical shape, etc. within the spirit and the scope of the disclosure. In an embodiment, in case that the display device 1 has a substantially polygonal shape in a plan view, corners of the polygonal shape may be substantially round. Hereinafter, for convenience of description, an example in which the display device 1 has a substantially rectangular shape having substantially round corners in a plan view will be described below.

In an embodiment, the display device 1 may have short sides in a first direction (for example, ±x direction) and long sides in a second direction (for example, ±y direction). Here, the first direction and the second direction may cross or intersect each other. However, one or more embodiments are not limited thereto, and in an embodiment, the display device 1 may have short sides in the first direction and long sides in the second direction, or a side in the first direction and a side in the second direction may have the same lengths.

The display device 1 may include a display area DA and a peripheral area PA outside of the display area DA. Pixels PX may be disposed in the display area DA, and the display device 1 may provide images via the pixels PX in the display area DA. Each of the pixels PX may be defined as an emission area from which light is emitted by a light-emitting device in the display device 1. Therefore, the display area DA may be defined by light-emitting devices. For example, each of the pixels PX may emit red light, green light, or blue light, and the display device 1 may provide images by using the light emitted from each of the pixels PX.

The display area DA may include a front display area FDA, side display areas SDA, and corner display areas CDA. For example, independent images may be provided by the pixels PX in each of the front display area FDA, the side display areas SDA, and the corner display areas CDA. In another example, one entire image may be provided by the pixels PX in each of the front display area FDA, the side display areas SDA, and the corner display areas CDA. For example, each of the front display area FDA, the side display areas SDA, and the corner display areas CDA may provide a part of one image.

The front display area FDA may be a flat display area, and may have, for example, a substantially rectangular shape in a plan view. For example, the front display area FDA may be at a center of the display device 1 and may be surrounded by the side display areas SDA. An image provided by the front display area FDA may occupy the largest ratio in the image provided by the display device 1.

The side display areas SDA may be display areas adjacent to respective edges of the front display area FDA. For example, the front display area FDA having the substantially rectangular shape may include four edges FDA-E1, FDA-E2, FDA-E3, and FDA-E4, and the side display areas SDA may include first to fourth side display areas SDA1, SDA2, SDA3, and SDA4 respectively adjacent to the four edges FDA-E1, FDA-E2, FDA-E3, and FDA-E4. However, one or more embodiments are not limited thereto, and there may be two or more side display areas SDA according to the shape of the front display area FDA in a plan view.

In an embodiment, each of the side display areas SDA may have a substantially curved surface extending and bending from each edge of the front display area FDA. For example, the first side display area SDA1 may include a substantially curved surface that extends from the first edge FDA-E1 of the front display area FDA in the −y direction and is bent about an axis extending in the ±x direction. The second side display area SDA2 may include a substantially curved surface that extends from the second edge FDA-E2 of the front display area FDA in the +x direction and is bent about an axis extending in the ±y direction. The third side display area SDA3 may include a substantially curved surface that extends from the third edge FDA-E3 of the front display area FDA in the +y direction and is bent about an axis extending in the ±x direction. The fourth side display area SDA4 may include a substantially curved surface that extends from the fourth edge FDA-E4 of the front display area FDA in the −x direction and is bent about an axis extending in the ±y direction. The curved surfaces of the first to fourth side display areas SDA1, SDA2, SDA3, and SDA4 may have curvature radii that are the same as or different from one another. In case that the side display areas SDA include the curved surfaces as described above, the aesthetic feeling of the display device 1 may be improved.

As shown in FIG. 1, the first edge FDA-E1 and the third edge FDA-E3 of the front display area FDA may face each other, and the first side display area SDA1 and the third side display area SDA3 may be at opposite sides with the front display area FDA therebetween. The second edge FDA-E2 and the fourth edge FDA-E4 of the front display area FDA may face each other, and the second side display area SDA2 and the fourth side display area SDA4 may be at opposite sides with the front display area FDA therebetween.

In an embodiment, extending lengths of the first edge FDA-E1 and the third edge FDA-E3 of the front display area FDA in the first direction (for example, ±x direction) may be different from extending lengths of the second edge FDA-E2 and the fourth edge FDA-E4 in the second direction (for example, ±y direction). For example, the extending lengths of the first edge FDA-E1 and the third edge FDA-E3 of the front display area FDA in the first direction may be less than the extending lengths of the second edge FDA-E2 and the fourth edge FDA-E4 in the second direction. Accordingly, the extending lengths of the first side display area SDA1 and the third side display area SDA3 in the first direction may be less than the extending lengths of the second side display area SDA2 and the fourth side display area SDA4 in the second direction. However, one or more embodiments are not limited thereto, and the extending lengths of the first edge FDA-E1 and the third edge FDA-E3 of the front display area FDA in the first direction may be equal to the extending lengths of the second edge FDA-E2 and the fourth edge FDA-E4 in the second direction.

The first edge FDA-E1 and the second edge FDA-E2 of the front display area FDA cross or intersect each other to form a first corner FDA-CN1 of the front display area FDA. Also, the second edge FDA-E2 and the third edge FDA-E3 of the front display area FDA cross or intersect each other to form a second corner FDA-CN2 of the front display area FDA, the third edge FDA-E3 and the fourth edge FDA-E4 of the front display area FDA cross or intersect each other to form a third corner FDA-CN3, and the fourth edge FDA-E4 and the first edge FDA-E1 of the front display area FDA cross or intersect each other to form a fourth corner FDA-CN4 of the front display area FDA.

The corner display areas CDA may be at corners of the front display area FDA and may each connect two adjacent side display areas SDA. For example, the first corner display area CDA1 may be at the first corner FDA-CN1 of the front display area FDA, and may connect the first side display area SDA1 to the second side display area SDA2. The second corner display area CDA2 may be at the second corner FDA-CN2 of the front display area FDA and may connect the second side display area SDA2 to the third side display area SDA3. The third corner display area CDA3 may be at the third corner FDA-CN3 of the front display area FDA and may connect the third side display area SDA3 to the fourth side display area SDA4. The fourth corner display area CDA4 may be at the fourth corner FDA-CN4 of the front display area FDA and may connect the fourth side display area SDA4 to the first side display area SDA1.

Because the corner display areas CDA each connect two side display areas SDA having the substantially curved surfaces bent in different directions, the corner display areas CDA may each have one curved surface or a curved surface, in which curved surfaces bent in various directions are continuously connected. Also, the corner display area CDA may have one curved surface or a curved surface, in which curved surfaces bent with various curvature radii are continuously connected, in case that two adjacent side display areas SDA are bent with different curvature radii.

The peripheral area PA may be an area that does not provide images, for example, a non-display area. The peripheral area PA may partially or entirely surround or may be adjacent to the display area DA. Drivers, etc. for providing electrical signals or electric power to each of the pixels PX may be disposed in the peripheral area PA. The peripheral area PA may include a pad that is a region to which an electronic device, a printed circuit board, etc. may be electrically connected.

The display device 1 may be used as a display screen in portable electronic devices such as a mobile phone, a smartphone, a tablet personal computer (PC), a mobile communication terminal, an electronic note, an electronic book, a portable multimedia player (PMP), a navigation device, an ultra-mobile PC (UMPC), and various products such as a television, a laptop computer, a monitor, a billboard, Internet of things (IoT), etc. within the spirit and the scope of the disclosure. Also, the display device 1 may be used in wearable devices such as a smartwatch, a watch phone, a glasses-type display, and a head-mounted display (HMD). Also, the display device 1 may be used in a dashboard of a vehicle, a center information display in a center fascia or dashboard of a vehicle, a rear-view mirror display that replaces a side-view mirror of a vehicle, a display screen in a rear side of a front seat as an entertainment for the back seat in a vehicle.

Figure 2:
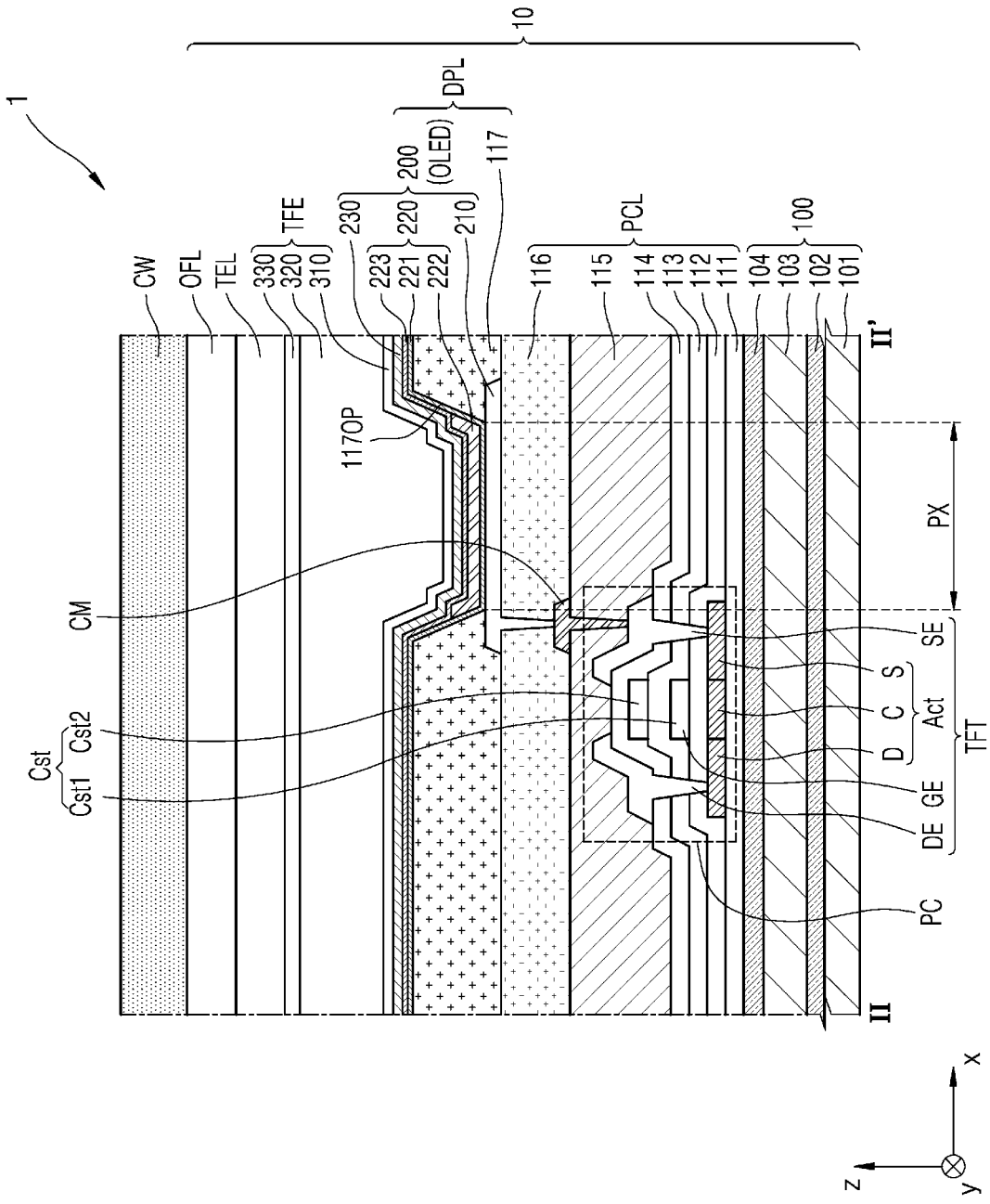
FIG. 2 is a schematic cross-sectional view partially showing a display device according to an embodiment.

FIG. 2 is a schematic cross-sectional view partially showing the display device 1 according to an embodiment. FIG. 2 may correspond to a cross-section of the electronic device 1, taken along line II-II' of FIG. 1.

Referring to FIG. 2, the display device 1 may include a display panel 10 and a cover window CW. The display panel 10 may have a stack structure including a substrate 100, a pixel circuit layer PCL, a display layer DPL, a thin film encapsulation layer TFE, a touch electrode layer TEL, and an optical functional layer OFL.

The substrate 100 may have a multi-layered structure including a base layer including a polymer resin and an inorganic layer. For example, the substrate 100 may include the base layer including a polymer resin and a barrier layer including an inorganic insulating layer. For example, the substrate 100 may include a first base layer 101, a first barrier layer 102, a second base layer 103, and a second barrier layer 104 that may be sequentially stacked each other in the stated order. The first and second base layers 101 and 103 may each include polyimide (PI), polyether sulfone (PES), polyarylate, polyetherimide (PEI), polyethylene naphthalate (PEN), polyethylene terephthalate (PET), polyphenylene sulfide (PPS), polycarbonate (PC), cellulose triacetate (TAC), and/or cellulose acetate propionate (CAP). The first barrier layer 102 and the second barrier layer 104 may each include an inorganic insulating material such as silicon oxide, silicon oxynitride, and/or silicon nitride. The substrate 100 may be flexible.

The pixel circuit layer PCL may be disposed on the substrate 100. The pixel circuit layer PCL may include a pixel circuit PC including a thin film transistor TFT and a storage capacitor Cst. The pixel circuit layer PCL may include a buffer layer 111, a first gate insulating layer 112, a second gate insulating layer 113, an interlayer insulating layer 114, a first planarized insulating layer 115, and a second planarized insulating layer 116 that may be under or below and/or on the elements of the pixel circuit PC.

The buffer layer 111 may reduce or prevent infiltration of impurities, moisture, or external air from below the substrate 100, and may provide a planarized surface on the substrate 100. The buffer layer 111 may include an inorganic insulating material such as silicon oxide, silicon oxynitride, and silicon nitride, and may have a single-layered or multi-layered structure including the stated materials.

The thin film transistor TFT on the buffer layer 111 may include a semiconductor layer Act, and the semiconductor layer Act may include polysilicon. As an example, the semiconductor layer Act may include amorphous silicon, an oxide semiconductor, an organic semiconductor, etc. within the spirit and the scope of the disclosure. The semiconductor layer Act may include a channel region C, and a drain region D and a source region S at opposite sides of the channel region C. A gate electrode GE may overlap the channel region C.

The gate electrode GE may include a low-resistive metal material. The gate electrode GE may include a conductive material including molybdenum (Mo), aluminum (Al), copper (Cu), titanium (Ti), etc., and may have a single-layered or multi-layered structure.

The first gate insulating layer 112 disposed between the semiconductor layer Act and the gate insulating layer GE may include an inorganic insulating material such as silicon oxide ($SiO_2$), silicon nitride (SiNx), silicon oxynitride (SiON), aluminum oxide ($Al_2O_3$), titanium oxide ($TiO_2$), tantalum oxide ($Ta_2O_5$), hafnium oxide ($HfO_2$), and zinc oxide ($ZnO_2$).

The second gate insulating layer 113 may cover or overlap the gate electrode GE. Similar to the first gate insulating layer 112, the second gate insulating layer 113 may include an inorganic insulating material such as silicon oxide ($SiO_2$), silicon nitride (SiNx), silicon oxynitride (SiON), aluminum oxide ($Al_2O_3$), titanium oxide ($TiO_2$), tantalum oxide ($Ta_2O_5$), hafnium oxide ($HfO_2$), and zinc oxide ($ZnO_2$).

An upper electrode Cst2 of the storage capacitor Cst may be disposed on the second gate insulating layer 113. The upper electrode Cst2 may overlap the gate electrode GE thereunder. Here, the gate electrode GE and the upper electrode Cst2 overlapping each other with the second gate insulating layer 113 disposed therebetween may form the storage capacitor Cst. For example, the gate electrode GE may function as a lower electrode Cst1 of the storage capacitor Cst.

As described above, the storage capacitor Cst and the thin film transistor TFT may overlap each other. In an embodiment, the storage capacitor Cst may not overlap the thin film transistor TFT.

The upper electrode Cst2 may include aluminum (Al), platinum (Pt), palladium (Pd), silver (Ag), magnesium (Mg), gold (Au), nickel (Ni), neodymium (Nd), iridium (Ir), chrome (Cr), calcium (Ca), molybdenum (Mo), titanium (Ti), tungsten (W), and/or copper (Cu) in a single-layered or multi-layered structure.

The interlayer insulating layer 114 may cover or overlap the upper electrode Cst2. The interlayer insulating layer 114 may include an insulating material such as silicon oxide ($SiO_2$), silicon nitride (SiNx), silicon oxynitride (SiON), aluminum oxide ($Al_2O_3$), titanium oxide ($TiO_2$), tantalum oxide ($Ta_2O_5$), hafnium oxide ($HfO_2$), and zinc oxide ($ZnO_2$). The interlayer insulating layer 114 may have a single-layered or a multi-layered structure including the inorganic insulating material.

A drain electrode DE and a source electrode SE may be on the interlayer insulating layer 114. The drain electrode DE and the source electrode SE may be respectively electrically connected to the drain region D and the source region S via contact holes in insulating layers thereunder. The drain electrode DE and the source electrode SE may include a highly conductive material. The drain electrode DE and the source electrode SE may include a conductive material including molybdenum (Mo), aluminum (Al), copper (Cu), titanium (Ti), etc., and may have a single-layered or multi-layered structure including the above materials. In an embodiment, the drain electrode DE and the source electrode SE may have a multi-layered structure including Ti/Al/Ti.

The first planarized insulating layer 115 may cover or overlap the drain electrode DE and the source electrode SE. The first planarized insulating layer 115 may include a general-purpose polymer (for example, polymethylmethacrylate (PMMA) or polystyrene (PS)), polymer derivatives having phenol groups, acryl-based polymer, imide-based polymer, aryl ether-based polymer, amide-based polymer, fluoride-based polymer, p-xylene-based polymer, vinyl alcohol-based polymer, and blends thereof.

The second planarized insulating layer 116 may be disposed on the first planarized insulating layer 115. The second organic insulating layer 116 may include the same material or similar material as that of the first planarized insulating layer 115, and an organic insulating material such as a general universal polymer (polymethylmethacrylate (PMMA) or polystyrene (PS)), polymer derivatives having phenol groups, acryl-based polymer, imide-based polymer, aryl ether-based polymer, amide-based polymer, fluoride-based polymer, p-xylene-based polymer, vinyl alcohol-based polymer, and blends thereof.

The display layer DPL may be disposed on the pixel circuit layer PCL having the above structure. The display layer DPL may include an organic light-emitting diode OLED as a light-emitting device 200, and the organic light-emitting diode OLED may include a stack structure including a pixel electrode 210, an intermediate layer 220, and an opposite electrode 230. The organic light-emitting diode OLED may emit, for example, red light, green light, or blue light. As an example, the organic light-emitting diode OLED may emit red light, green light, blue light, or white light. The organic light-emitting diode OLED emits light through an emission area, and the emission area may be defined as a pixel PX.

The pixel electrode 210 may be electrically connected to the thin film transistor TFT via contact holes in the second planarized insulating layer 116 and the first planarized insulating layer 115 and a contact metal CM disposed on the first planarized insulating layer 115.

The pixel electrode 210 may include a conductive oxide such as indium tin oxide (ITO), indium zinc oxide (IZO), zinc oxide (ZnO), indium oxide ($In_2O_3$), indium gallium oxide, or aluminum zinc oxide (AZO). In an embodiment, the pixel electrode 210 may include a reflective layer including argentum (Ag), magnesium (Mg), aluminum (Al), platinum (Pt), palladium (Pd), aurum (Au), nickel (Ni), neodymium (Nd), iridium (Ir), chromium (Cr), or a compound thereof. In an embodiment, the pixel electrode 210 may further include a layer including ITO, IZO, ZnO, or $In_2O_3$ on and/or under or below the reflective layer.

A pixel defining layer 117 having an opening 117OP exposing a center of the pixel electrode 210 may be disposed on the pixel electrode 210. The pixel defining layer 117 may include an organic insulating material and/or an inorganic insulating material. The opening 117OP of the pixel defining layer 117 may define an emission area of the light emitted from the organic light-emitting diode OLED. For example, a size or width of the opening 117OP of the pixel defining layer 117 may correspond to a size or width of the emission area. Therefore, a size and/or a width of the pixel PX may be dependent upon the size and/or width of the corresponding opening 117OP of the pixel defining layer 117.

The intermediate layer 220 may include the emission layer 222 corresponding to the pixel electrode 210. The emission layer 222 may include a polymer or low-molecular weight organic material emitting a color light. As an example, the emission layer 222 may include an inorganic light-emitting material or quantum dots.

A first functional layer 221 and a second functional layer 223 may be disposed on and under or below the emission layer 222. The first functional layer 221 may include, for example, a hole transport layer (HTL), or an HTL and a hole injection layer (HIL). The second functional layer 223 may be disposed on the emission layer 222, and may include an electron transport layer (ETL) and/or an electron injection layer (EIL). The first functional layer 221 and/or the second functional layer 223 may be common layers that may entirely cover or overlap the substrate 100, like an opposite electrode 230 that will be described later.

The opposite electrode 230 may be disposed on the pixel electrode 210 and may overlap the pixel electrode 210. The opposite electrode 230 may include a conductive material having a low work function. For example, the opposite electrode 230 may include a (semi-)transparent layer including argentum (Ag), magnesium (Mg), aluminum (Al), platinum (Pt), palladium (Pd), aurum (Au), nickel (Ni), neodymium (Nd), iridium (Ir), chromium (Cr), lithium (Li), calcium (Ca), or an alloy thereof. As an example, the opposite electrode 230 may further include a layer including ITO, IZO, ZnO, or $In_2O_3$ on the (semi-)transparent layer including the above material. The opposite electrode 230 may be integrally formed to entirely cover or overlap the substrate 100.

The display panel 10 may include light-emitting devices 200, and the light-emitting devices 200 emit light via the pixels PX to provide images. For example, the display area DA (see FIG. 1) may be defined by the light-emitting devices 200. Therefore, the display panel 10 may include the display area DA defined by the light-emitting devices 200, and the display area DA of the display panel 10 may correspond to the display area DA of the display device 1 described above with reference to FIG. 1. In other words, the front display area FDA, the side display areas SDA, and the corner display areas CDA of the display device 1 in FIG. 1 may be the front display area FDA, the side display areas SDA, and the corner display areas CDA of the display panel 10.

The thin film encapsulation layer TFE may be disposed on the display layer DPL and may cover or overlap the display layer DPL. The thin film encapsulation layer TFE may include at least one inorganic encapsulation layer and at least one organic encapsulation layer, and FIG. 2 shows that the thin film encapsulation layer TFE may include a first inorganic encapsulation layer 310, an organic encapsulation layer 320, and a second inorganic encapsulation layer 330 that may be sequentially stacked each other.

The first inorganic encapsulation layer 310 and the second inorganic encapsulation layer 330 may each include one or more inorganic materials from aluminum oxide, titanium oxide, tantalum oxide, hafnium oxide, zinc oxide, silicon nitride, and silicon oxynitride. The organic encapsulation layer 320 may include a polymer-based material. The polymer-based material may include an acryl-based resin, an epoxy-based resin, polyimide, polyethylene, etc. within the spirit and the scope of the disclosure. In an embodiment, the organic encapsulation layer 320 may include acrylate. The organic encapsulation layer 320 may be obtained by curing a monomer or applying polymer. The organic encapsulation layer 320 may be transparent.

The touch electrode layer TEL including touch electrodes may be disposed on the thin film encapsulation layer TFE, and the optical functional layer OFL may be disposed on the touch electrode layer TEL. The touch electrode layer TFE may obtain coordinate information according to an external input, for example, a touch event. The optical functional layer OFL may reduce a reflectivity of light (external light) incident to the display device 1, and/or may improve color purity of light emitted from the display device 1.

An adhesive member may be disposed between the touch electrode layer TEL and the optical functional layer OFL. General adhesive members may be used without restriction within the spirit and the scope of the disclosure. The adhesive member may include a pressure sensitive adhesive (PSA) or an optically clear adhesive (OCA).

The cover window CW may be disposed on the display panel 10. The cover window CW may be bonded to the display panel 10 via an adhesive member. The adhesive member may include, for example, a pressure sensitive adhesive (PSA) or an optically clear adhesive (OCA).

The cover window CW may have high transmittance in order to transmit light emitted from the display panel 10 and may have a reduced thickness in order to reduce a weight of the display device 1. Also, the cover window CW may have an excellent strength and hardness in order to protect the display panel 10 against external shock. For example, the cover window CW may include a flexible window. The cover window CW may protect the display panel 10 while easily bending according to an external force without generating cracks.

The cover window CW may include, for example, glass or plastic. In an embodiment, the cover window CW may include ultra-thin glass (UTG) having a strength that is increased by a chemical strengthening or a thermal strengthening method. As an example, the cover window CW may include colorless polyimide (CPI).

In the above description, the display device 1 may include an organic light-emitting diode OLED as the light-emitting device 200, but the display device 1 according to one or more embodiments is not limited thereto. In an embodiment, the display device 1 may include a light-emitting display device including an inorganic light-emitting diode (an inorganic light-emitting display or an inorganic EL display device). The inorganic light-emitting diode may include a PN junction diode including inorganic material semiconductor-based materials. In case that a voltage is applied to the PN junction diode in a forward direction, holes and electrons are injected, and energy generated by recombination of the holes and electrons is converted into light energy to emit light having a certain or selected color. The inorganic light-emitting diode may have a width of a few to hundreds of micrometers, and in an embodiment, the inorganic light-emitting diode may be referred to as a micro-LED.

Figure 3:
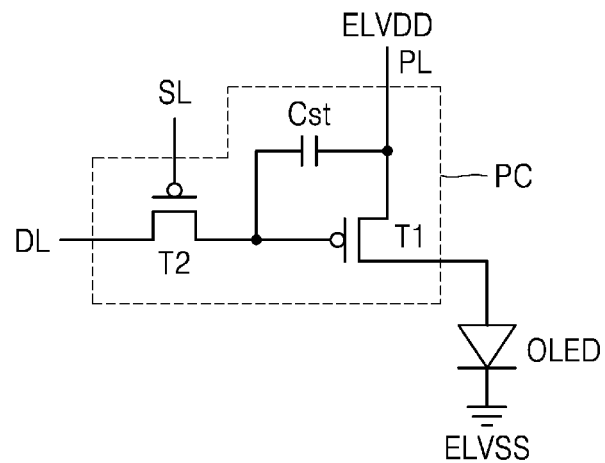
FIG. 3 is a schematic diagram of an equivalent circuit of a pixel in a display device according to an embodiment.

FIG. 3 is a schematic diagram of an equivalent circuit of a pixel circuit PC in a display device according to an embodiment.

Referring to FIG. 3, the pixel circuit PC may include thin film transistors TFT (see FIG. 2) and the storage capacitor Cst, and may be electrically connected to an organic light-emitting diode OLED. In an embodiment, the pixel circuit PC may include a driving thin film transistor T1, a switching thin film transistor T2, and the storage capacitor Cst.

The switching thin film transistor T2 may be electrically connected to a scan line SL and a data line DL, and may transfer a data signal or a data voltage input from the data line DL to the driving thin film transistor T1 based on a scan signal or a switching voltage input from the scan line SL. The storage capacitor Cst may be electrically connected to the switching thin film transistor T2 and a driving voltage line PL and may store a voltage corresponding to a difference between a voltage transferred from the switching thin film transistor T2 and a first power voltage ELVDD supplied to the driving voltage line PL.

The driving thin film transistor T1 may be electrically connected to the driving voltage line PL and the storage capacitor Cst and may control a driving current flowing from the driving voltage line PL to the organic light-emitting diode OLED in response to the voltage value stored in the storage capacitor Cst. An opposite electrode (for example, a cathode) of the organic light-emitting diode OLED may receive supply of a second power voltage ELVSS. The organic light-emitting diode OLED may emit light having a certain or given luminance according to the driving current.

FIG. 3 shows an example in which the pixel circuit PC may include two thin film transistors and one storage capacitor, but one or more embodiments are not limited thereto. For example, the pixel circuit PC may include three or more thin film transistors and/or two or more storage capacitors. In an embodiment, the pixel circuit PC may include seven thin film transistors and one storage capacitor. The number of thin film transistors and the number of storage capacitors may vary depending on a design of the pixel circuit PC. Hereinafter, for convenience of description, an example in which the pixel circuit PC may include two thin film transistors and one storage capacitor will be described below.

Figure 4:
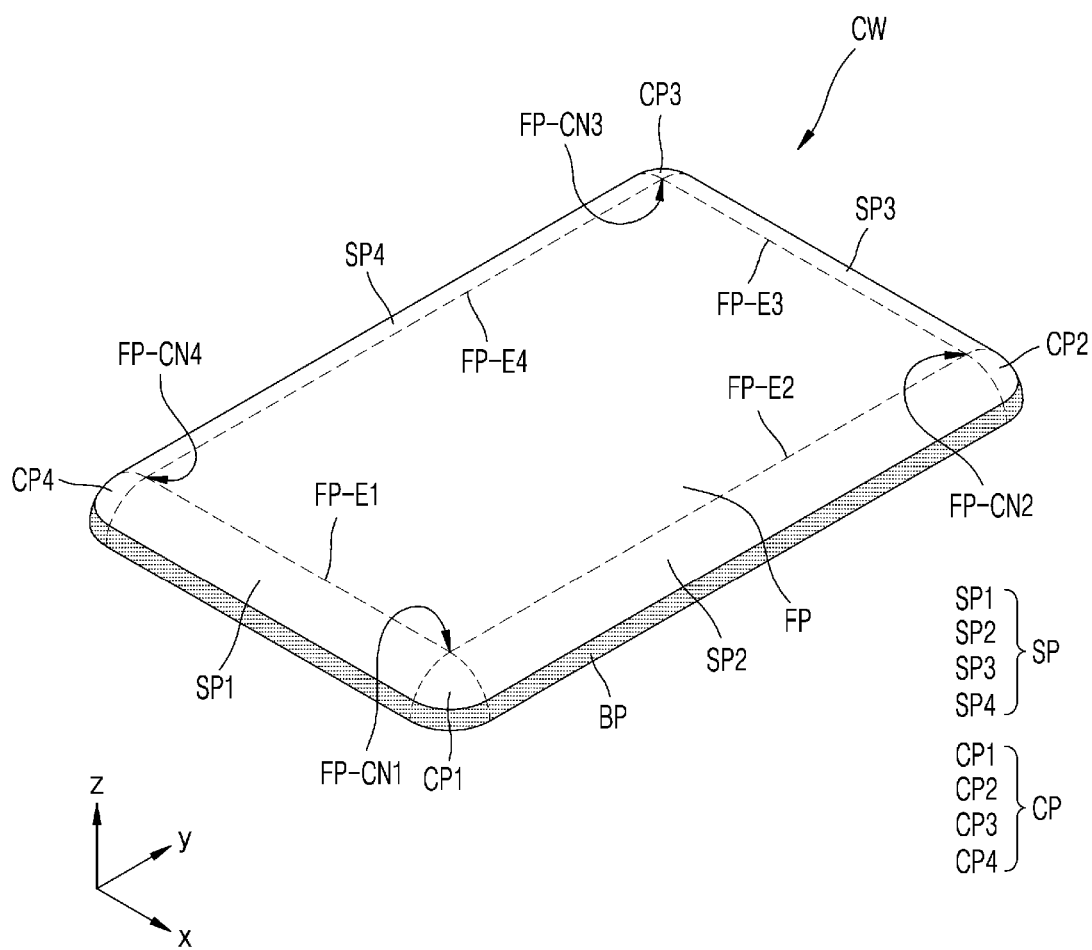
FIG. 4 is a schematic cross-sectional view showing a region of a cover window according to an embodiment.

FIG. 4 is a schematic cross-sectional view showing a region of the cover window CW according to an embodiment.

Referring to FIG. 4, the cover window CW may have a shape substantially corresponding to an entire shape of the display device 1 (see FIG. 1). For example, in case that the display device 1 has a substantially rectangular shape in a plan view, the cover window CW may have a substantially rectangular shape in a plan view. In an embodiment, in case that the display device 1 has a substantially polygonal shape such as a substantially triangular shape, a substantially rectangular shape, etc. a substantially circular shape, a substantially elliptical shape, etc., the cover window CW may also have the above shapes. Hereinafter, for convenience of description, similar to the shape of the display device 1 shown in FIG. 1, an example in which the cover window CW has a substantially rectangular shape having substantially round corners will be described below.

The cover window CW may include a front portion FP, side portions SP, and corner portions CP. The front portion FP may have a flat surface, for example, may have a substantially rectangular shape in a plan view. In an embodiment, the front portion FP may be at a center of the cover window CW and may be surrounded by the side portions SP. The front portion FP of the cover window CW may correspond to the front display area FDA of the display device 1. Here, the components "corresponding to" each other may denote that the components overlap each other when seen from a direction perpendicular to a surface of the cover window CW.

The side portions SP may be adjacent to respective edges of the front portion FP. For example, the front portion FP having the substantially rectangular shape has four edges FP-E1, FP-E2, FP-E3, and FP-E4, and, the side portions SP may include first to fourth side portions SP1, SP2, SP3, and SP4 that are respectively adjacent to four edges FP-E1, FP-E2, FP-E3, and FP-E4 of the front portion FP. However, one or more embodiments are not limited thereto, for example, two or more side portions may be provided. Each of the first to fourth side portions SP1, SP2, SP3, and SP4 of the cover window CW may correspond to the first to fourth side display areas SDA1, SDA2, SDA3, and SDA4 of the display device 1.

In an embodiment, each of the side portions SP may extend and be bent from each of the edge of the front portion FP. For example, the first side portion SP1 may extend from the first edge FP-E1 of the front portion FP in a −y direction, and may be bent about an axis extending in a ±x direction. The second side portion SP2 may extend from the second edge FP-E2 in a +x direction, the second edge FP-E2 of the front portion FP crossing or intersecting the first edge FP-E1 of the front portion FP, and may be bent about an axis extending in a ±y direction. The third side portion SP3 extends from the third edge FP-E3 of the front portion FP in the +y direction, and may be bent about an axis extending in the ±x direction. The fourth side portion SP4 extends from the fourth edge FP-E4 of the front portion FP in the −x direction, and may be bent about an axis extending in the ±y direction. Each of the first to fourth side portions SP1, SP2, SP3, and SP4 may be bent with the same curvature radius or different curvature radii from one another.

As shown in FIG. 4, the first edge FP-E1 and the third edge FP-E3 of the front portion FP face each other, and the second edge FP-E2 and the fourth edge FP-E4 may face each other. The first side portion SP1 and the third side portion SP3 are opposite to each other with the front portion FP therebetween, and the second side portion SP2 and the fourth side portion SP4 may be opposite to each other with the front portion FP therebetween.

In an embodiment, extending lengths of the first edge FP-E1 and the third edge FP-E3 of the front portion FP in the first direction (for example, ±x direction) may be different from extending lengths of the second edge FP-E2 and the fourth edge FP-E4 in the second direction (for example, ±y direction). For example, the extending lengths of the first edge FP-E1 and the third edge FP-E3 of the front portion FP in the first direction may be less than the extending lengths of the second edge FP-E2 and the fourth edge FP-E4 in the second direction. Accordingly, the extending lengths of the first side portion SP1 and the third side portion SP3 in the first direction may be less than the extending lengths of the second side portion SP2 and the fourth side portion SP4 in the second direction. However, one or more embodiments are not limited thereto, and the extending lengths of the first edge FP-E1 and the third edge FP-E3 of the front portion FP in the first direction may be equal to the extending lengths of the second edge FP-E2 and the fourth edge FP-E4 in the second direction.

The first edge FP-E1 and the second edge FP-E2 of the front portion FP cross or intersect each other to form a first corner FP-CN1 of the front portion FP. Also, the second edge FP-E2 and the third edge FP-E3 of the front portion FP cross or intersect each other to form a second corner FP-CN2 of the front portion FP, the third edge FP-E3 and the fourth edge FP-E4 of the front portion FP cross or intersect each other to form a third corner FP-CN3 of the front portion FP, and the fourth edge FP-E4 and the first edge FP-E1 of the front portion FP cross or intersect each other to form a fourth corner FP-CN4 of the front portion FP.

The corner portions CP may be at corner sides of the front portion FP and may connect two adjacent side portions SP. For example, the first corner portion CP1 may be at the first corner FP-CN1 side of the front portion FP, and may connect the first side portion SP1 to the second side portion SP2. The second corner portion CP2 may be at the second corner FP-CN2 side of the front portion FP and may connect the second side portion SP2 to the third side portion SP3. The third corner portion CP3 may be at the third corner FP-CN3 side of the front portion FP and may connect the third side portion SP3 to the fourth side portion SP4. The fourth corner portion CP4 may be at the fourth corner FP-CN4 side of the front portion FP and may connect the fourth side portion SP4 to the first side portion SP1. The first to fourth corner portions CP1, CP2, CP3, and CP4 of the cover window CW may respectively correspond to the first to fourth corner display areas CDA1, CDA2, CDA3, and CDA4 of the display device 1.

Because the corner portion CP connects the side portions SP bent in different directions, the corner portion CP may have one curved surface or a curved surface in which curved surfaces bent in various directions are continuously connected. Also, the corner portions CP may each have one curved surface or a curved surface, in which curved surfaces bent with various curvature radii are continuously connected, in case that two adjacent side portions SP are bent with different curvature radii.

The cover window CW is at the outermost side of the display device 1 and may be a component that affects the outer appearance of the display device 1 and with which a user comes into contact or direct contact. The cover window CW may include the side portions SP and the corner portions CP that are bent, and thus, the aesthetic feeling of the outer appearance of the display device 1 may be improved and an excellent grip sense may be provided to the user who touches the display device 1.

The cover window CW may further include a light-blocking portion BP. The light-blocking portion BP of the cover window CW may extend from edges of the side portions SP and the corner portions CP. The light-blocking portion BP may be opposite to the front portion FP with the side portions SP and the corner portions CP therebetween. In an example, the light-blocking portion BP may at least partially surround the side portions SP and the corner portions CP. The light-blocking portion BP may correspond to the peripheral area PA of the display device 1. The light-blocking portion BP may include a light-blocking material and may block transmission of light. As such, various electronic devices in the peripheral area PA, for example, a non-display area, may be prevented from being visible to the user.

Figure 5:
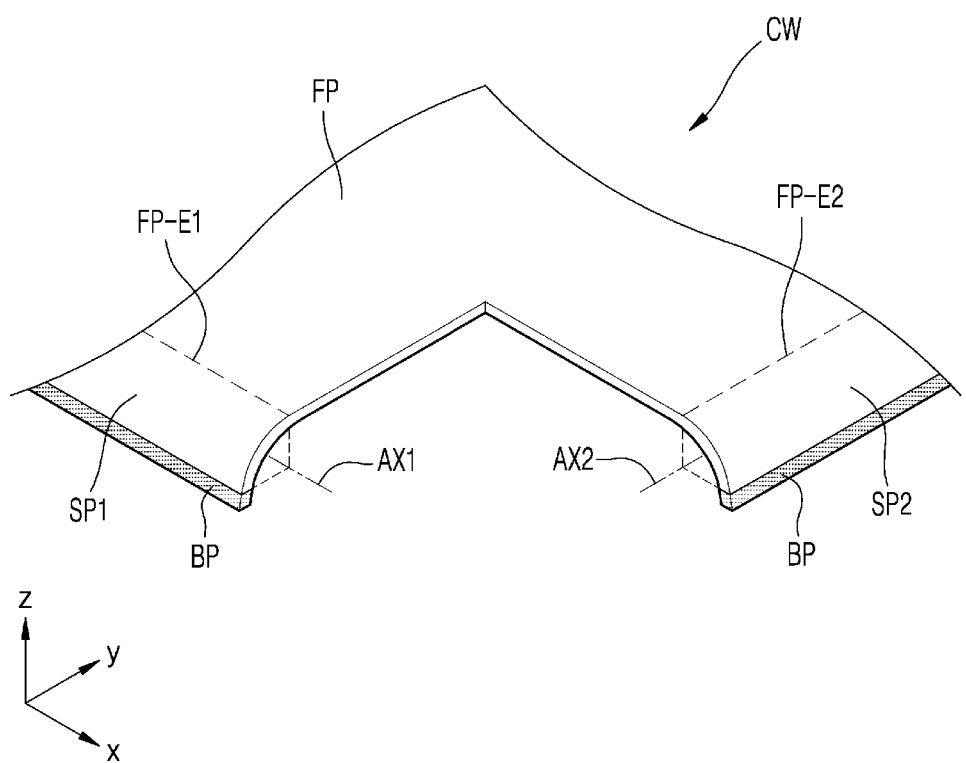
FIG. 5 is a schematic perspective view partially showing a region of a cover window according to an embodiment.

FIG. 5 is a schematic perspective view partially showing a region of the cover window CW according to an embodiment.

FIG. 5 shows the cover window CW based on the first side portion SP1 and the second side portion SP2 of the cover window CW, and for convenience of description, the first corner portion CP1 (see FIG. 4) may be omitted and cross-sections of the first side portion SP1 and the second side portion SP2 are shown. Like reference numerals denote the same components as those described above with reference to FIG. 4, and thus, detailed descriptions thereof are omitted.

Referring to FIG. 5, the first side portion SP1 of the cover window CW extends from the first edge FP-E1 of the front portion FP, and may be bent about a virtual first axis AX1 that is parallel to the first edge FP-E1. For example, the first edge FP-E1 of the front portion FP extends in the ±x direction, and the first axis AX1 may also extend in the ±x direction. The first axis AX1 is inside of the cover window CW, and the inside of the cover window CW denotes a side to which the display panel 10 is attached.

The second side portion SP2 of the cover window CW extends from the second edge FP-E2 of the front portion FP and may be bent about a virtual second axis AX2 that is parallel to the second edge FP-E2. For example, the second edge FP-E2 of the front portion FP extends in the ±y direction, and the second axis AX2 may also extend in the ±y direction. For example, the first axis AX1 and the second axis AX2 may respectively extend in directions crossing or intersecting each other. The second axis AX2 may be inside of the cover window CW.

Figure 6:
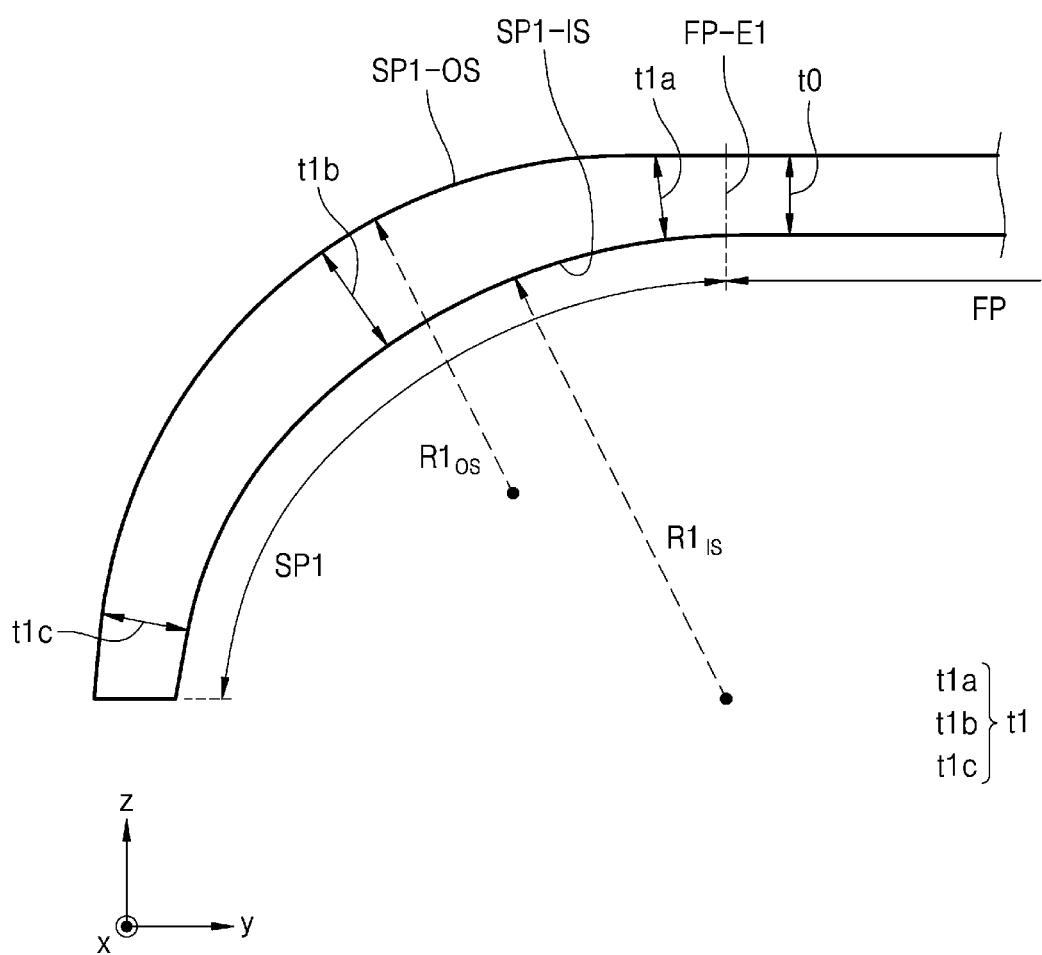
FIG. 6 is an enlarged schematic cross-sectional view showing a region of a cover window according to an embodiment.

FIG. 6 is an enlarged schematic cross-sectional view showing a region of the cover window CW according to an embodiment, and shows a schematic cross-sectional view of the first side portion SP1 of the cover window CW.

Referring to FIG. 6, the first side portion SP1 of the cover window CW may include an outer surface SP1-OS and an inner surface SP1-IS that are at opposite sides and have different curvature radii. For example, the first side portion SP1 may include the inner surface SP1-IS located or disposed inside of the cover window CW and the outer surface SP1-OS that may be an opposite surface to the inner surface SP1-IS. As described above, 'inside' of the cover window CW may denote a side to which the display panel 10 is attached. The inner surface SP1-IS and the outer surface SP1-OS of the first side portion SP1 may respectively include substantially curved surfaces.

Each of the inner surface SP1-IS and the outer surface SP1-OS of the first side portion SP1 has a certain radius of curvature, for example, may have a curved line having a certain radius of curvature on a cross-section thereof. Here, 'on the cross-section' may denote 'on a cross-section seen from a direction in which a virtual axis of the bending of each side portion SP extends' or 'on a virtual plane that is perpendicular to a virtual axis that is the axis of the bending of each side portion SP.' For example, FIG. 6 shows the cross-sectional shape of the first side portion SP1, and shows an aspect seen from an extending direction (for example, −x direction in FIG. 6) of the first axis AX1 (see FIG. 5).

Also, the 'curved line' may include a part of a substantially elliptical shape or an atypical arc, as well as an arc. In case that the curved line is an arc, the radius of curvature may be determined as a radius of the arc. In case that the curved line may include a part of an ellipse or an atypical arc, the radius of curvature may be defined as a radius of an arc in case that at least a part of the curved line is approximately the arc. For convenience of description, a case in which the curved line may include the arc will be described below.

According to an embodiment, the inner surface SP1-IS and the outer surface SP1-OS of the first side portion SP1 may have different curvature radii. A curvature radius $R1_{IS}$ of the inner surface SP1-IS of the first side portion SP1 may be different from a curvature radius $R1_{OS}$ of the corresponding outer surface SP1-OS. In an embodiment, the curvature radius $R1_{OS}$ of the outer surface SP1-OS of the first side portion SP1 may be less than the curvature radius $R1_{IS}$ of the inner surface SP1-IS. For example, the curvature radius $R1_{OS}$ of the outer surface SP1-OS of the first side portion SP1 may be about 3.9 mm or less and the curvature radius $R1_{IS}$ of the inner surface SP1-IS may exceed about 3.9 mm. As an example, the curvature radius $R1_{IS}$ of the outer surface SP1-OS of the first side portion SP1 may be about 3.15 mm or less and the curvature radius $R1_{IS}$ of the inner surface SP1-IS may exceed about 3.15 mm.

The outer surface SP1-OS of the first side portion SP1 in the cover window CW may form an outermost surface of the display device 1, and may be a surface that the user comes in contact or direct contact with. As the curvature radius $R1_{OS}$ of the outer surface SP1-OS of the first side portion SP1 decreases, a curvature of the first side portion SP1 may increase. As the curvature of the first side portion SP1 in the cover window CW increases, the user may be provided with excellent grip sense in case that contacting the first side portion SP1 of the cover window CW.

According to an embodiment, a thickness t1 of the first side portion SP1 may change in a direction away from the first edge FP-E1 of the front portion FP. Here, the 'thickness' of the first side portion SP1 may be defined as a straight distance from an arbitrary point on the inner surface SP1-IS of the first side portion SP1 to the outer surface SP1-OS corresponding to the inner surface SP1-IS in a normal direction to the point. However, a thickness t0 of the front portion FP may be consistent.

In an embodiment, the thickness t1 of the first side portion SP1 may be gradually increased in a direction away from the first edge FP-E1 of the front portion FP and may be reduced again. For example, FIG. 6 shows thicknesses t1a, t1b, and t1c at three arbitrary points of the first side portion SP1. The first thickness t1a of the first side portion SP1 may be less than the second thickness t1b of the first side portion SP1, and the second thickness t1b of the first side portion SP1 may be greater than the third thickness t1c of the first side portion SP1.

In an embodiment, the maximum thickness of the first side portion SP1 may be greater than the thickness t0 of the front portion FP. The second thickness t1b of the first side portion SP1 shown in FIG. 6 may be the maximum thickness of the first side portion SP1, and, the second thickness t1b of the first side portion SP1 may be greater than the thickness t0 of the front portion FP.

Due to the above characteristics of the thickness t1 of the first side portion SP1, the curvature of the outer surface SP1-OS of the first side portion SP1 may be greater than that of the corresponding inner surface SP1-IS. For example, the curvature radius $R1_{OS}$ of the outer surface SP1-OS of the first side portion SP1 may be less than the curvature radius $R1_{IS}$ of the inner surface SP1-IS of the first side portion SP1.

In case that the display device 1 is dropped, the first side portion SP1 of the cover window CW is highly likely to be damaged. According to an embodiment, in case that the first side portion SP1 has a relatively greater thickness, the durability and impact resistance may be improved and the strength may be reinforced.

The characteristics of the first side portion SP1 described above with reference to FIG. 6 may be also applied to the other side portions, for example, the second to fourth side portions SP2, SP3, and SP4. For example, the second side portion SP2 (see FIG. 5) may include an inner surface located or disposed inside of the cover window CW and an outer surface opposite to the inner surface, and a curvature radius of the outer surface of the second side portion SP2 may be different from a curvature radius of the corresponding inner surface. In an embodiment, the curvature radius of the outer surface of the second side portion SP2 may be less than that of the corresponding inner surface. Also, a thickness of the second side portion SP2 may vary in a direction away from the second edge FP-E2 (see FIG. 5) of the front portion FP. In an embodiment, the thickness of the second side portion SP2 may be gradually increased in a direction away from the second edge FP-E2, and, may be reduced again. The maximum thickness of the second side portion SP2 may be greater than the thickness t0 of the front portion FP. Descriptions about the third side portion SP3 and the fourth side portion SP4 are omitted for simplicity of description.

Figure 7:
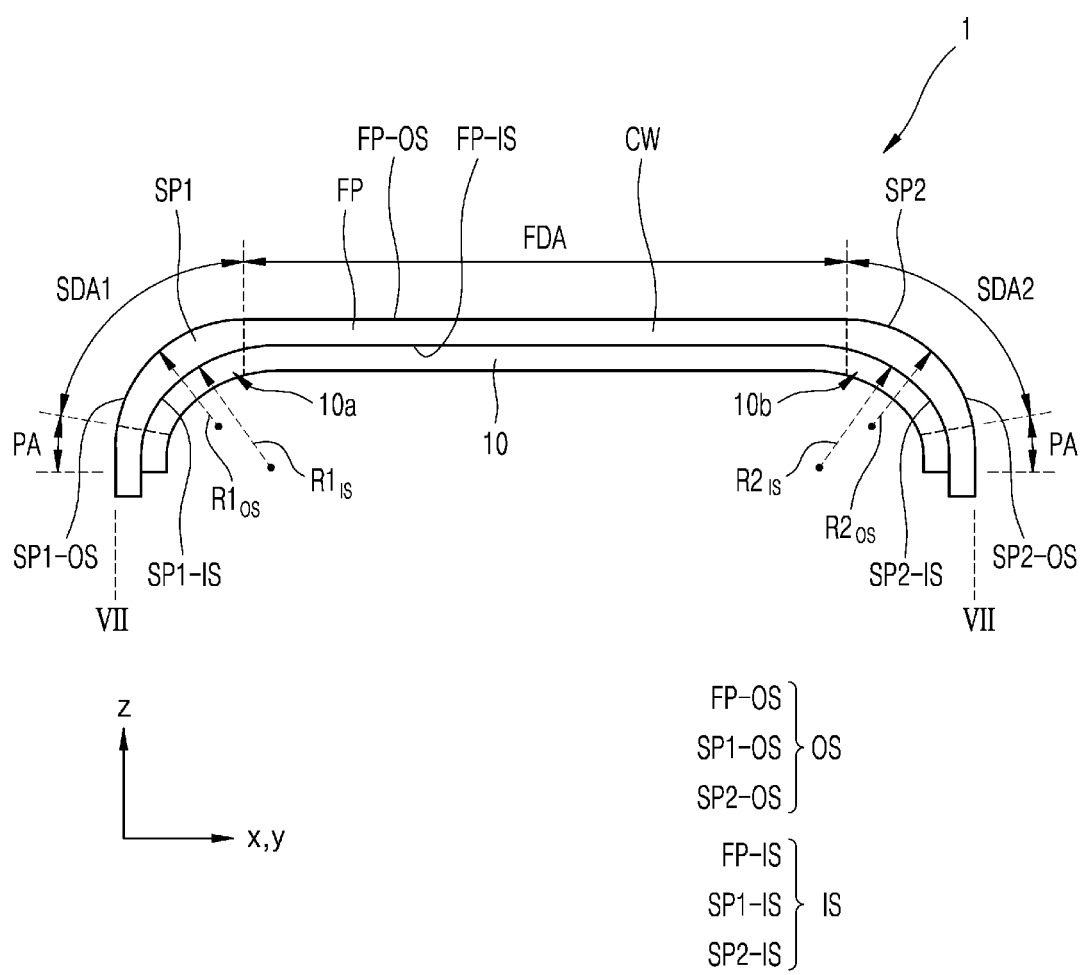
FIG. 7 is a schematic cross-sectional view of components in a display device according to an embodiment.

FIG. 7 is a schematic cross-sectional view of components in the display device 1 according to an embodiment. FIG. 7 may be a schematic cross-sectional view of the display device 1 taken along line VII-VII' in FIG. 1.

Referring to FIG. 7, the display panel 10 of the display device 1 is inside of the cover window CW, and may be at least partially surrounded by the cover window CW to be protected against external shock.

The cover window CW may include an inner surface IS facing the display panel 10 and an outer surface OS opposite to the inner surface IS, and the display panel 10 may be attached to the inner surface IS of the cover window CW. Although not shown in FIG. 7, according to an embodiment, a pressure sensitive adhesive (PSA) or an optically clear adhesive (OCA) may be used to bond the display panel 10. The inner surface IS may also include an inner surface front portion FP-IS, and the outer surface OS may include an outer surface front portion FP-OS.

The display area DA of the display panel 10 may correspond to a part of the cover window CW. For example, the front display area FDA of the display panel 10 corresponds to the front portion FP of the cover window CW, the first side display area SDA1 of the display panel 10 corresponds to the first side portion SP1 of the cover window CW, and the second side display area SDA2 of the display panel 10 corresponds to the second side portion SP2 of the cover window CW. Although not shown in FIG. 7, the third and fourth side display areas SDA3 and SDA4 (see FIG. 1) of the display panel 10 may respectively correspond to the third and fourth side portions SP3 and SP4 (see FIG. 4) of the cover window CW, and the first to fourth corner display areas CDA1, CDA2, CDA3, and CDA4 of the display panel 10 may correspond to the first to fourth corner portions CP1, CP2, CP3, and CP4 of the cover window CW.

According to an embodiment, the display panel 10 may include portions bent along the inner surfaces of the side portions SP of the cover window CW. For example, the display panel 10 may include a first portion 10a that is bent along the inner surface SP1-IS of the first side portion SP1 of the cover window CW, and a second portion 10b that is bent along the inner surface SP2-IS of the second side portion SP2 of the cover window CW. A surface of the first portion 10a in the display panel 10 may have a curvature radius that is the same as the curvature radius $R1_{IS}$ of the inner surface SP1-IS of the first side portion SP1 in the cover window CW, and the surface of the first portion 10a in the display panel 10 may be attached to the inner surface SP1-IS of the first side portion SP1 of the cover window CW. Similarly, a surface of the second portion 10b in the display panel 10 may have the same curvature radius as a curvature radius $R2_{IS}$ of the inner surface SP2-IS of the second side portion SP2 in the cover window CW, and the surface of the second portion 10b of the display panel 10 may be attached to the inner surface SP2-IS of the second side portion SP2 of the cover window CW.

In order for the display panel 10 to be attached to the inner surface IS of the cover window CW, a part of the display panel 10 may be bent. As the curvature radius of the bent part is reduced (for example, the curvature is increased), large stress may be applied to the bent part of the display panel 10. In case that the large stress is applied to the display panel 10, components such as a light-emitting device, an electronic device, etc. in the display panel 10 may be damaged, thereby causing the display device 1 to be defective.

According to an embodiment, the curvature radius $R1_{IS}$ of the inner surface SP1-IS of the first side portion SP1 in the cover window CW is greater than the curvature radius $R1_{OS}$ of the corresponding outer surface SP1-OS, and the first portion 10a of the display panel 10 may be bent at the same curvature radius as the curvature radius $R1_{IS}$ of the inner surface SP1-IS of the first side portion SP1 in the cover window CW. As such, the stress applied to the first portion 10a of the display panel 10 may be reduced, and accordingly, damage and defects of the display device 1 may be reduced. The outer surface OS may also include an outer surface of the second side portion SP2-OS. FIG. 7 also illustrates curvature radius $R2_{OS}$ of the outer surface SP2-OS of the second side portion SP2.

The above effect may be further evident in the corner display areas CDA of the display panel 10, in which the curved surfaces bent in various directions are continuously connected as one curved surface or a curved surface. The corner display areas CDA of the display panel 10 may be weakest points with respect to the stress due to the bending. Thus, in case that the inner surfaces of the corner portions CP in the cover window CW have relatively large curvature radii, the curvatures at the corner display areas CDA of the display panel 10 may be reduced and the damage and defects may be reduced.

Figure 8:
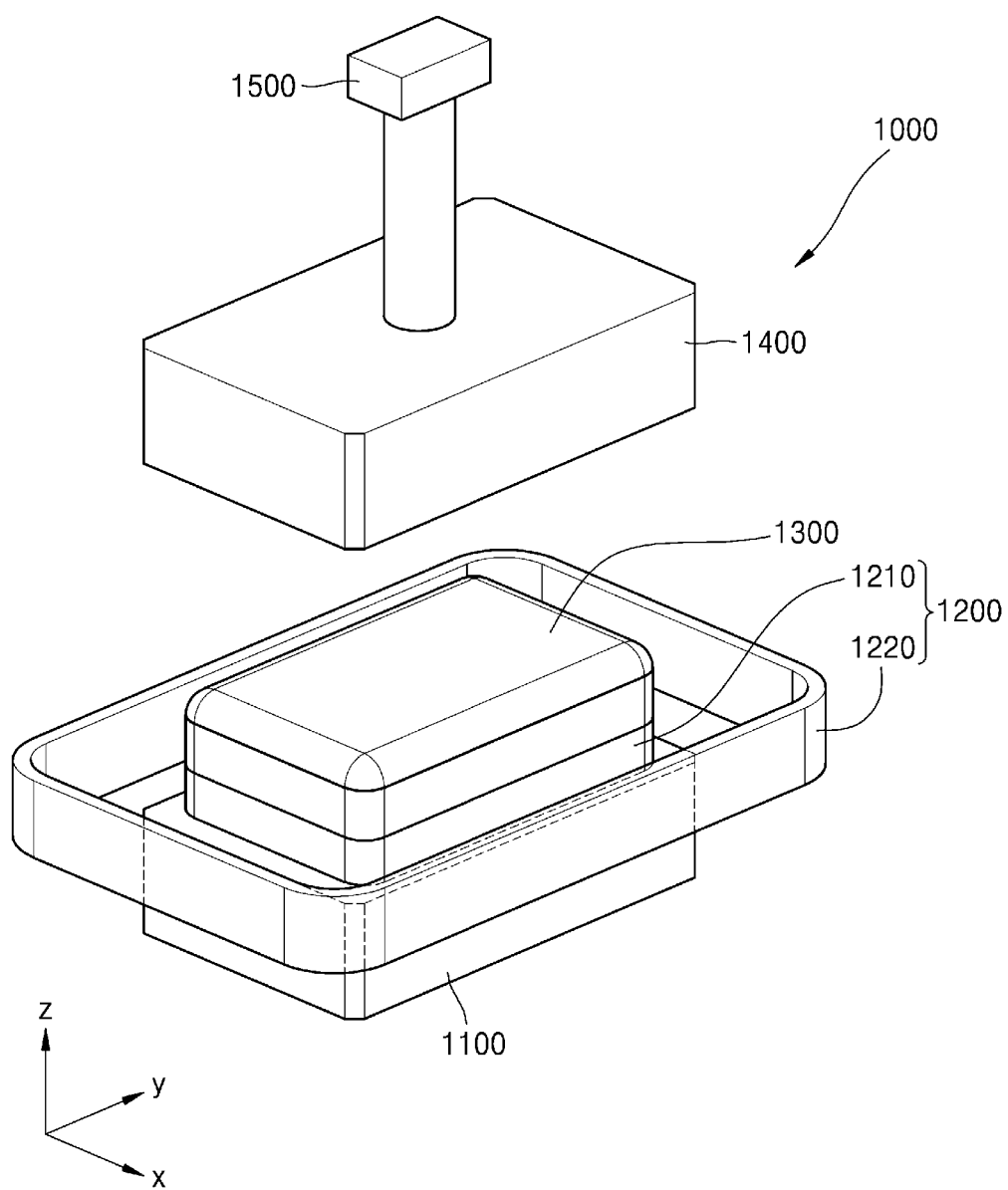
FIG. 8 is a schematic perspective view of an apparatus for manufacturing the display device of FIG. 1.

FIG. 8 is a perspective view of an apparatus 1000 for manufacturing a display device of FIG. 1.

Referring to FIG. 8, the apparatus 1000 for manufacturing a display device may include a base 1100, a heater 1200, a first mold 1300, a second mold 1400, and a moving portion 1500.

The base 1100 may have a flat upper surface on which the first mold 1300 may be arranged or disposed. The first mold 1300 is on the base 1100 and may have a support surface on which the cover window CW (see FIG. 4) may be mounted or disposed. The support surface may have a flat surface defined by a first direction (for example, ±x direction) and a second direction (for example, ±y direction) that crosses or intersects the first direction. Also, the support surface of the first mold 1300 may have a shape substantially corresponding to that of an inner surface of the cover window CW after the cover window CW is completely molded.

The second mold 1400 may be on the first mold 1300, facing the first mold 1300. The second mold 1400 may have a pressing surface that presses the upper surface of the cover window CW mounted on the first mold 1300. The pressing surface of the second mold 1400 may press the cover window CW to partially bend the cover window CW. The pressing surface of the second mold 1400 may have a shape substantially corresponding to that of an outer surface of the cover window CW after being molded.

The moving portion 1500 may move the second mold 1400 in a third direction (for example, ±z direction) that crosses or intersects the first and second directions. For example, the moving portion 1500 may move the second mold 1400 downward to and/or upward from the first mold 1300. In an embodiment, the moving portion 1500 may be connected to the second mold 1400 and may include a linear driver (not shown). In an example, the linear driver of the moving portion 1500 may include a pneumatic cylinder, a hydraulic cylinder, or a linear motor. In another example, the linear driver of the moving portion 1500 may include a rack gear, a pinion gear, and a motor connected to the rack gear and the pinion gear. In another example, the linear driver of the moving portion 1500 may include a ball screw and a motor connected to the ball screw. One or more embodiments are not limited thereto, and the moving portion 1500 may include all kinds of devices and structures that may linearly move.

In an embodiment, the heater 1200 applies heat to the cover window CW to make the cover window CW be easily molded. The heater 1200 may include a first heater 1210 that is in contact with the first mold 1300 and a second heater 1220 spaced apart from the first mold 1300.

The first heater 1210 may be disposed on the base 1100 and under or below the first mold 1300. The first heater 1210 supplies or directly supplies conductive heat to the first mold 1300 and applies the heat to the cover window CW via the first mold 1300. The first heater 1210 may be provided as a bar type or a plate type, for example, a ceramic heater.

The second heater 1220 may be formed, for example, as a coil that supplies radiant heat and convection heat to the cover window CW. In another example, the second heater 1220 may include a laser irradiation unit that irradiates laser to apply heat to the cover window CW.

Figure 9:
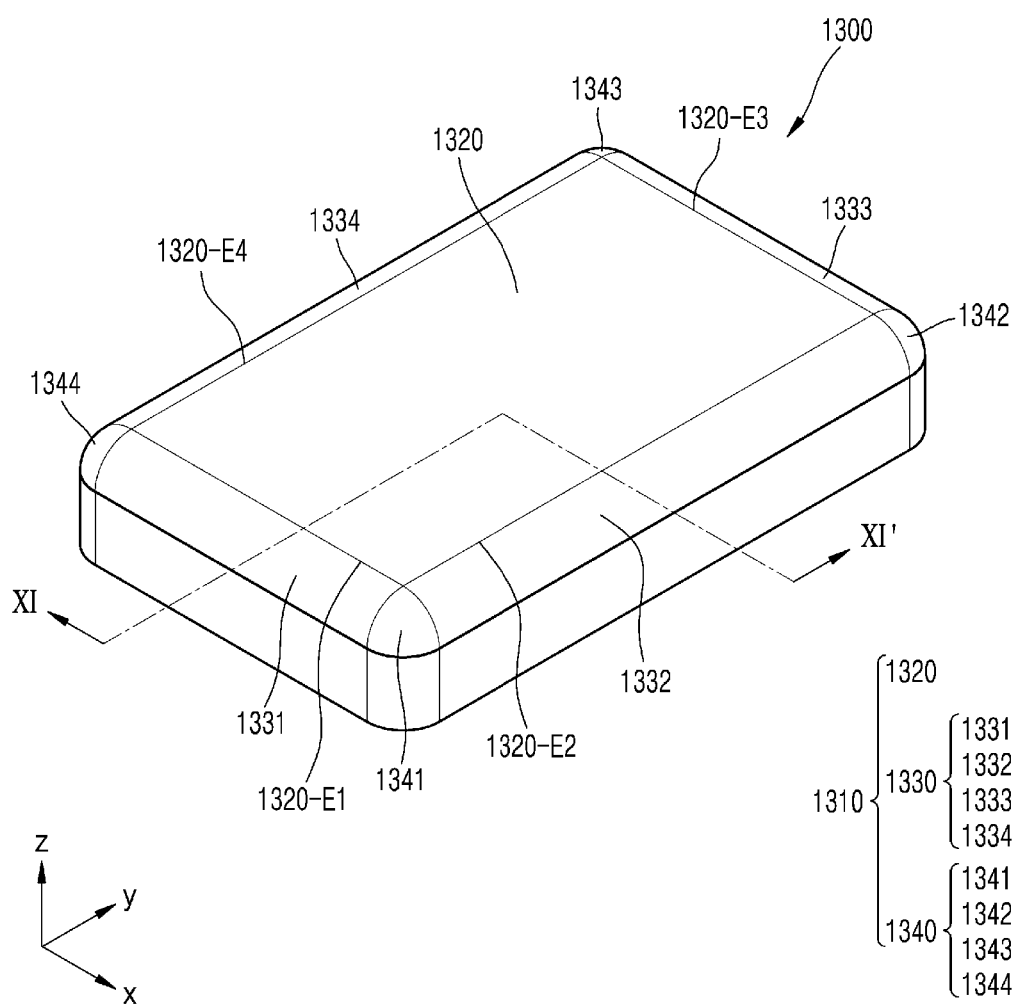
FIG. 9 is a schematic perspective view of a first mold of an apparatus for manufacturing the display device, according to an embodiment.

FIG. 9 is a perspective view of the first mold 1300 of an apparatus for manufacturing a display device, according to an embodiment.

Referring to FIG. 9, the first mold 1300 may include a support surface 1310 on which the cover window CW (see FIG. 4) is mounted. The support surface 1310 of the first mold 1300 may include a flat support surface 1320, curved support surfaces 1330, and corner support surfaces 1340.

The flat support surface 1320 may have a flat surface defined by the first direction (for example, ±x direction) and the second direction (for example, ±y direction) that crosses or intersects the first direction. The flat support surface 1320 may correspond to an inner surface of the front portion FP (see FIG. 4) of the cover window CW after the cover window CW is completely molded.

The curved support surfaces 1330 extend from respective edges of the flat support surface 1320 and may each have a certain radius of curvature. For example, the curved support surfaces 1330 may include a first curved support surface 1331 extending from a first edge 1320-E1 of the flat support surface 1320 and having a first curvature radius, a second curved support surface 1332 extending from a second edge 1320-E2 of the flat support surface 1320 and having a second curvature radius, a third curved support surface 1333 extending from a third edge 1320-E3 of the flat support surface 1320 and having a third curvature radius, and a fourth curved support surface 1334 extending from a fourth edge 1320-E4 of the flat support surface 1320 and having a fourth curvature radius. The first to fourth curved support surfaces 1331, 1332, 1333, and 1334 may correspond to inner surfaces of the first to fourth side portions SP1, SP2, SP3, and SP4 (see FIG. 4) of the cover window CW, after the cover window CW is completely molded.

The corner support surfaces 1340 may be at corners of the flat support surface 1320, and may connect two curved support surfaces adjacent to each other. In an example, the corner support surfaces 1340 may include first to fourth corner support surfaces 1341, 1342, 1343, and 1344. For example, the first corner support surface 1341 may be at a corner where the first edge 1320-E1 and the second edge 1320-E2 of the flat support surface 1320 cross or intersect each other, and may connect the first curved support surface 1331 and the second curved support surface 1332 to each other. Similarly, the second corner support surface 1342 may be at a corner where the second edge 1320-E2 and the third edge 1320-E3 of the flat support surface 1320 cross or intersect each other, and may connect the second curved support surface 1332 and the third curved support surface 1333 to each other. The third corner support surface 1343 may be at a corner where the third edge 1320-E3 and the fourth edge 1320-E4 of the flat support surface 1320 cross or intersect each other, and may connect the third curved support surface 1333 and the fourth curved support surface 1334 to each other. The fourth corner support surface 1344 may be at a corner where the fourth edge 1320-E4 and the first edge 1320-E1 of the flat support surface 1320 cross or intersect each other, and may connect the fourth curved support surface 1334 and the first curved support surface 1331 to each other. The first to fourth corner support surfaces 1341, 1342, 1343, and 1344 may respectively correspond to the first to fourth corner portions CP1, CP2, CP3, and CP4 (see FIG. 4) of the cover window CW after the cover window CW is completely molded.

As such, the support surface 1310 of the first mold 1300 may have a shape substantially corresponding to that of an inner surface of the cover window CW after the cover window CW is completely molded.

Although FIG. 9 shows that the first mold 1300 has a substantially rectangular shape with round corners in a plan view, one or more embodiments are not limited thereto. As described above, the substantially planar shape of the first mold 1300 may be changed according to the substantially planar shape of the display device 1 and the cover window CW.

Figure 10:
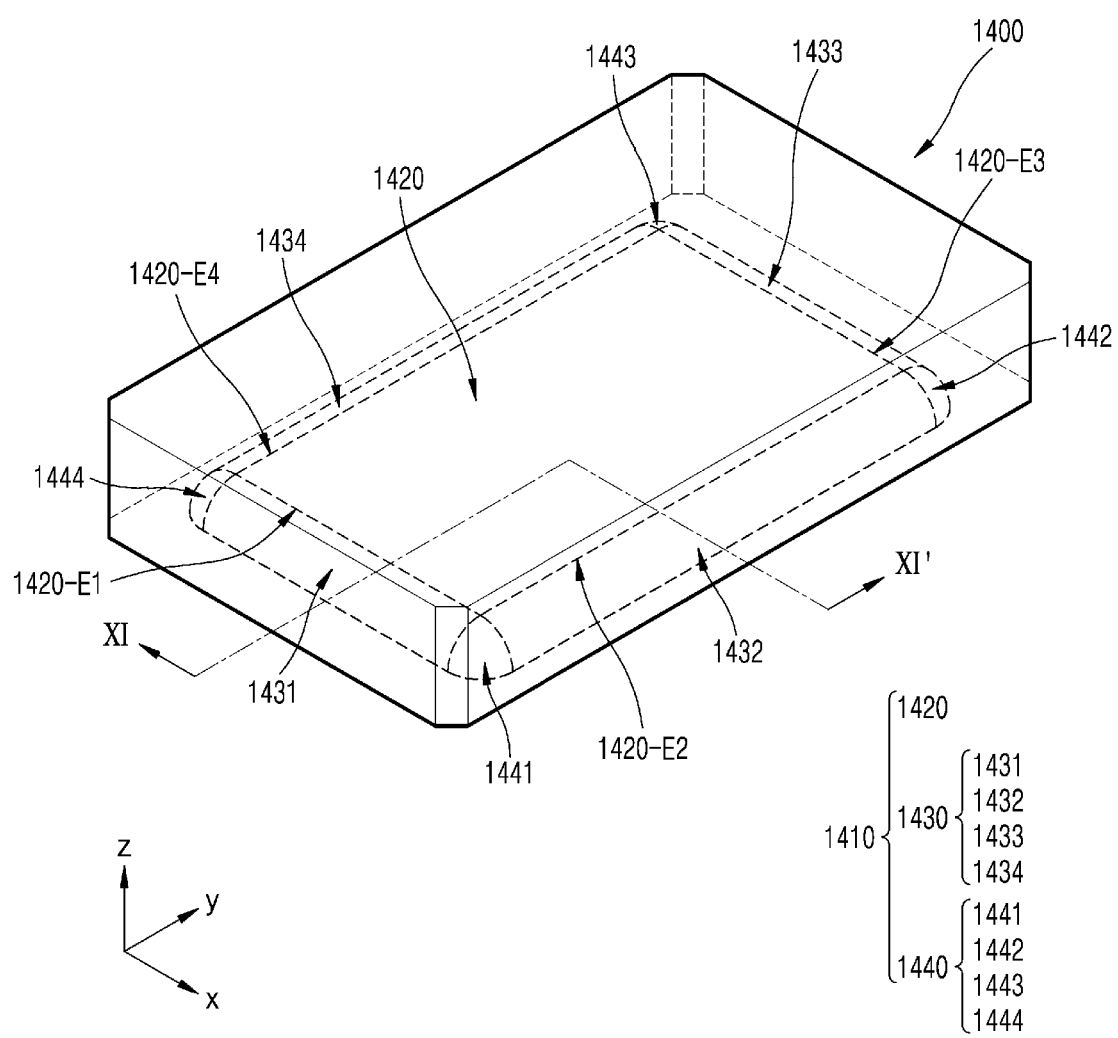
FIG. 10 is a schematic perspective view of a second mold of an apparatus for manufacturing the display device, according to an embodiment.

FIG. 10 is a perspective view of the second mold 1400 of an apparatus for manufacturing the display device, according to an embodiment.

Referring to FIG. 10, the second mold 1400 may include a pressing surface 1410 facing the first mold 1300 (see FIG. 9) and pressing the upper surface of the cover window CW (see FIG. 4) that is mounted on the first mold 1300. For example, the pressing surface 1410 of the second mold 1400 may be at a lower surface of the second mold 1400. Therefore, in FIG. 10, the pressing surface 1410 of the second mold 1400 is depicted by dashed lines. The pressing surface 1410 of the second mold 1400 may include a flat pressing surface 1420, curved pressing surfaces 1430, and corner pressing surfaces 1440.

The flat pressing surface 1420 corresponds to the flat support surface 1320 (see FIG. 9) of the first mold 1300, and may have a flat surface that is in parallel with the flat support surface 1320. The flat pressing surface 1420 may correspond to an outer surface of the front portion FP (see FIG. 4) of the cover window CW after the cover window CW is completely molded.

The curved pressing surfaces 1430 extend from respective edges of the flat pressing surface 1420 and may each have a certain radius of curvature. For example, the curved pressing surfaces 1430 may include a first curved pressing surface 1431 extending from a first edge 1420-E1 of the flat pressing surface 1420 and having a fifth curvature radius, a second curved pressing surface 1432 extending from a second edge 1420-E2 of the flat pressing surface 1420 and having a sixth curvature radius, a third curved pressing surface 1433 extending from a third edge 1420-E3 of the flat pressing surface 1420 and having a seventh curvature radius, and a fourth curved pressing surface 1434 extending from a fourth edge 1420-E4 of the flat pressing surface 1420 and having a eighth curvature radius.

The first to fourth curved pressing surfaces 1431, 1432, 1433, and1434 of the second mold 1400 may respectively correspond to the first to fourth curved support surfaces 1331, 1332, 1333, and 1334 of the first mold 1300. According to an embodiment, the fifth curvature radius of the first curved pressing surface 1431 may be different from the first curvature radius of the first curved support surface 1331. The sixth curvature radius of the second curved pressing surface 1432 may be different from the second curvature radius of the second curved support surface 1332. The seventh curvature radius of the third curved pressing surface 1433 may be different from the third curvature radius of the third curved support surface 1333. The eighth curvature radius of the fourth curved pressing surface 1434 may be different from the fourth curvature radius of the fourth curved support surface 1334.

The first to fourth curved pressing surfaces 1431, 1432, 1433, and 1434 of the second mold 1400 may correspond to outer surfaces of the first to fourth side portions SP1, SP2, SP3, and SP4 (see FIG. 4) of the cover window CW, after the cover window CW is completely molded.

The corner pressing surfaces 1440 may be at corner sides of the flat pressing surface 1420 and may connect two adjacent curved pressing surfaces. In an example, the corner pressing surfaces 1440 may include first to fourth corner pressing surfaces 1441, 1442, 1443, and 1444. For example, the first corner pressing surface 1441 may be at a corner where the first edge 1420-E1 and the second edge 1420-E2 of the flat pressing surface 1420 cross or intersect each other, and may connect the first curved pressing surface 1431 and the second curved pressing surface 1432 to each other. Similarly, the second corner pressing surface 1442 may be at a corner where the second edge 1420-E2 and the third edge 1420-E3 of the flat pressing surface 1420 cross or intersect each other, and may connect the second curved pressing surface 1432 and the third curved pressing surface 1433 to each other. The third corner pressing surface 1443 may be at a corner where the third edge 1420-E3 and the fourth edge 1420-E4 of the flat pressing surface 1420 cross or intersect each other, and may connect the third curved pressing surface 1433 and the fourth curved pressing surface 1434 to each other. The fourth corner pressing surface 1444 may be at a corner where the fourth edge 1420-E4 and the first edge 1420-E1 of the flat pressing surface 1420 cross or intersect each other, and may connect the fourth curved pressing surface 1434 and the first curved pressing surface 1431 to each other. The first to fourth corner pressing surfaces 1441 to 1444 of the second mold 1400 may respectively correspond to the first to fourth corner support surfaces 1341 to 1344 of the first mold 1300.

The first to fourth corner pressing surfaces 1441, 1442, 1443, and 1444 may respectively correspond to outer surfaces of the first to fourth corner portions CP1, CP2, CP3, and CP4 (see FIG. 4) of the cover window CW after the cover window CW is completely molded. As such, the pressing surface 1410 of the second mold 1400 may have a shape substantially corresponding to that of an outer surface of the cover window CW after the cover window CW is completely molded.

Figure 11A:
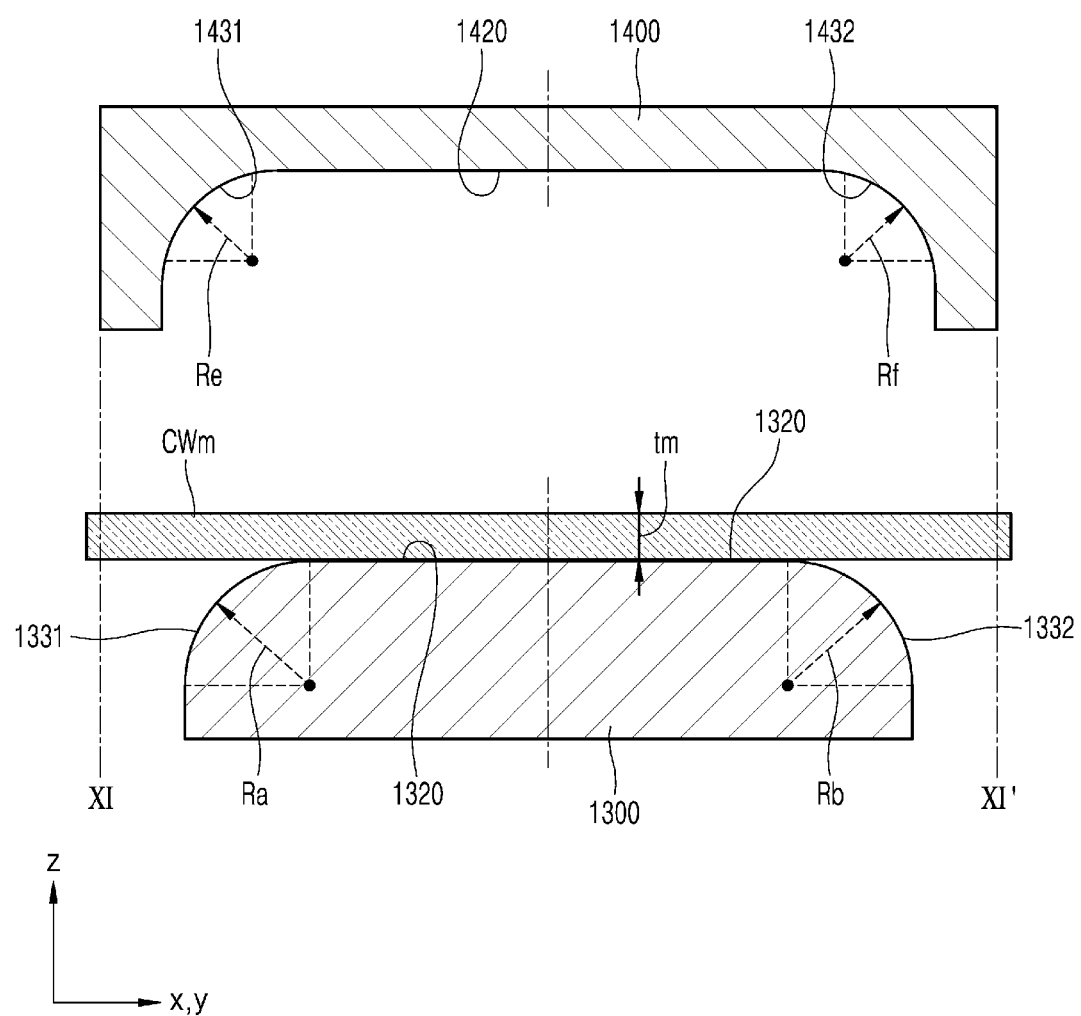
FIGS. 11A to 11C are schematic cross-sectional views illustrating processes in a method of manufacturing a display device by using the apparatus for manufacturing a display device according to an embodiment.
Figure 11B:
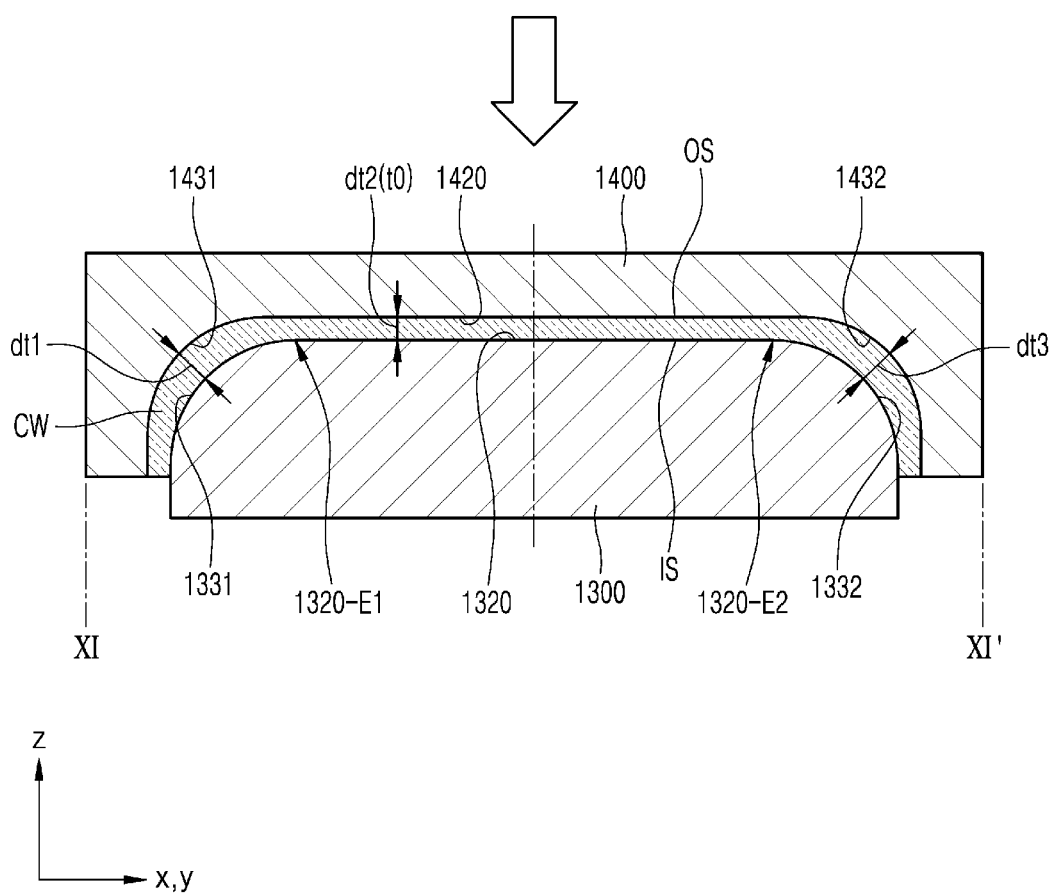
Figure 11C:
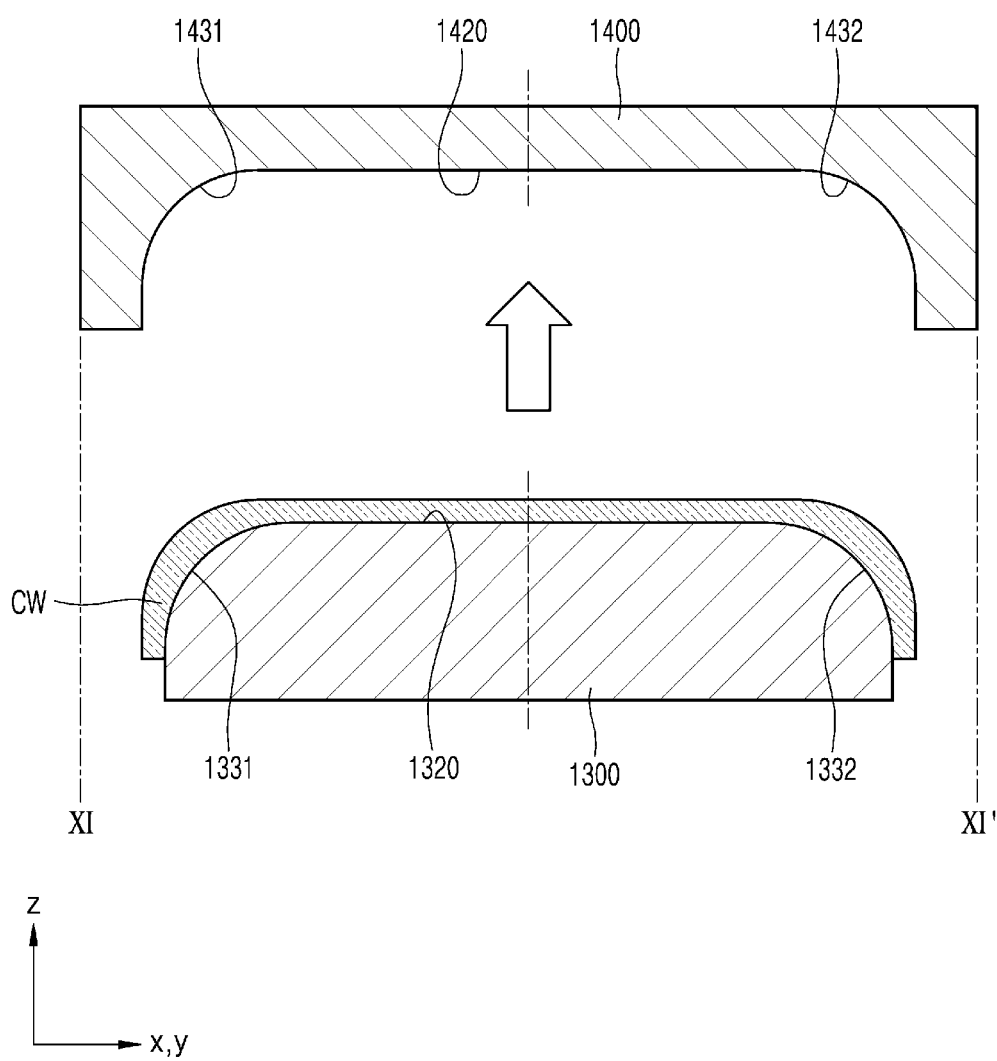

FIGS. 11A to 11C are schematic cross-sectional views illustrating processes in a method of manufacturing a display device by using the apparatus for manufacturing a display device according to an embodiment. FIGS. 11A to 11C are schematic cross-sectional views of the first mold 1300 and the second mold 1400 taken along line XI-XI' in FIGS. 9 and 10.

Referring to FIG. 11A, a cover window member CWm may be prepared on the flat support surface 1320 of the first mold 1300. Here, the cover window member CWm may denote the cover window CW before being molded, and may include the same material or similar material as that of the cover window CW.

In an embodiment, a thickness tm of the cover window member CWm may be equal to or greater than the largest thickness of the side portions SP in the cover window CW after being molded. Therefore, the thickness tm of the cover window member CWm may be greater than that of the front portion FP of the cover window CW after being molded. For example, the thickness tm of the cover window member CWm may be equal to or greater than a maximum thickness t1$b$ of the first side portion SP1 (see FIG. 5) of the cover window CW (see FIG. 6), and may be greater than that of the front portion FP of the cover window CW. In case that the thickness tm of the cover window member CWm before being molded is less than the maximum thickness t1$b$ of the first side portion SP1 of the cover window CW after being molded, the first side portion SP1 may not be formed constantly in a desired shape.

According to an embodiment, the curvature radius in each of the curved support surfaces 1320 (see FIG. 9) of the first mold 1300 may be greater than that in each of the curved pressing surfaces 1420 (see FIG. 10) of the second mold 1400. For example, as shown in FIG. 11A, a first curvature radius Ra of the first curved support surface 1331 of the first mold 1300 may be greater than a fifth curvature radius Re of the first curved pressing surface 1431 of the second mold 1400, and a second curvature radius Rb of the second curved support surface 1332 of the first mold 1300 may be greater than a sixth curvature radius Rf of the second curved pressing surface 1432 of the second mold 1400. Although not shown in FIG. 11A, the third curvature radius of the third curved support surface 1333 of the first mold 1300 may be greater than the seventh curvature radius of the third curved pressing surface 1433 of the second mold 1400, and the fourth curvature radius of the fourth curved support surface 1334 of the first mold 1300 may be greater than the eighth curvature radius of the fourth curved pressing surface 1434 of the second mold 1400. As such, the curvature radii of the inner surfaces of the side portions SP in the cover window CW may be greater than those of corresponding outer surfaces, wherein the cover window CW is molded by using the first mold 1300 and the second mold 1400. Also, the curvature radius of each of the curved support surfaces 1330 in the first mold 1300 is relatively large, and thus, the cover window CW may be easily extracted from the first mold 1300.

Referring to FIG. 11B, the second mold 1400 may be moved toward the first mold 1300 by the moving portion 1500 (see FIG. 8) so as to press the cover window member CWm (see FIG. 11A) on the first mold 1300. As the second mold 1400 presses the cover window member CWm, the cover window member CWm may be molded according to the shapes of the support surfaces 1310 of the first mold 1300 and the pressing surfaces 1410 of the second mold 1400. The shape of the outer surface OS of the cover window CW substantially corresponds to the shape of the pressing surface 1410 of the second mold 1400, and the shape of the inner surface IS of the cover window CW may substantially correspond to the shape of the support surface 1310 of the first mold 1300.

The second mold 1400 is moved toward the first mold 1300, but one or more embodiments are not limited thereto. The cover window CW may be molded according to relative movements of the first mold 1300 and the second mold 1400, and thus, the first mold 1300 may be moved toward the second mold 1400.

According to an embodiment, in case that the pressing surface 1410 of the second mold 1400 presses the cover window CW, gaps between the curved support surfaces 1320 (see FIG. 9) of the first mold 1300 and corresponding curved pressing surfaces 1420 (see FIG. 10) of the second mold 1400 may be greater than a gap between the flat support surface 1320 of the first mold 1300 and the flat pressing surface 1420 of the second mold 1400.

For example, as shown in FIG. 11B, a first distance dt1 between the first curved pressing surface 1431 of the second mold 1400 and the first curved support surface 1331 of the first mold 1300 may be greater than a second distance dt2 between the flat pressing surface 1420 of the second mold 1400 and the flat support surface 1320 of the first mold 1300. A third distance dt3 between the second curved pressing surface 1432 of the second mold 1400 and the second curved support surface 1332 of the first mold 1300 may be greater than the second distance dt2. Although not shown in FIG. 11B, a distance between the third curved pressing surface 1433 of the second mold 1400 and the third curved support surface 1333 of the first mold 1300 and a distance between the fourth curved pressing surface 1434 of the second mold 1400 and the fourth curved support surface 1334 of the first mold 1300 may be greater than the second distance dt2. As such, the cover window CW may be formed such that the maximum thicknesses of the side portions SP in the cover window CW molded by using the first mold 1300 and the second mold 1400 may be greater than the thickness of the front portion FP of the cover window CW.

According to an embodiment, the distance between the curved support surfaces 1330 of the first mold 1300 and the curved pressing surfaces 1430 of the second mold 1400 may vary in a direction away from the respective edges of the flat support surface 1320 of the first mold 1300. Here, 'distance' may be defined as a distance from an arbitrary point on the curved support surfaces 1330 to corresponding curved pressing surfaces 1430 in a normal direction with respect to the point. On the contrary, the second distance dt2 between the flat support surface 1320 of the first mold 1300 and the flat pressing surface 1420 of the second mold 1400 may be consistent between any points on the surfaces.

For example, as shown in FIG. 11B, the first distance dt1 between the first curved pressing surface 1431 of the second mold 1400 and the first curved support surface 1331 of the first mold 1300 may be gradually increased in a direction away from the first edge 1320-E1 of the flat support surface 1320 of the first mold 1300, and, is reduced again. The third distance dt3 between the second curved pressing surface 1432 of the second mold 1400 and the second curved support surface 1332 of the first mold 1300 may be gradually increased in a direction away from the second edge 1320-E2 of the flat support surface 1320 and may be reduced again. Although not shown in FIG. 11B, a distance between the third curved pressing surface 1433 (see FIG. 10) of the second mold 1400 and the third curved support surface 1333 (see FIG. 9) of the first mold 1300 may be also gradually increased and may be reduced again in a direction away from the third edge 1320-E3 (see FIG. 9) of the flat support surface 1320, and a distance between the fourth curved pressing surface 1434 (see FIG. 10) of the second mold 1400 and the fourth curved support surface 1334 (see FIG. 9) of the first mold 1300 may be gradually increased and reduced again in a direction away from the fourth edge 1320-E4 (see FIG. 9) of the flat support surface 1320. As such, the cover window CW molded by using the first mold 1300 and the second mold 1400 may be formed such that the thickness of each of the side portions SP in the cover window CW may vary in a direction away from each edge of the front portion FP.

According to an embodiment, in case that the cover window CW is molded, heat may be applied to the cover window CW in order to increase temperatures of the cover window CW and periphery of the cover window CW. As such, the deformation in the shape of the cover window CW may be easily performed.

According to an embodiment, a pressure applied to the cover window CW during the molding may be determined such that the thickness tm of the cover window member CWm is reduced to the thickness t0 of the front portion FP of the cover window CW as the second mold 1400 presses the cover window CW. Here, the thickness t0 of the front portion FP may be substantially equal to the second distance dt2 between the flat support surface 1320 of the first mold 1300 and the flat pressing surface 1420 of the second mold 1400 in a state in which the first mold 1300 and the second mold 1400 press the cover window CW. As compared with a case, in which the thickness tm of the cover window member CWm is substantially equal to the thickness t0 of the front portion FP of the cover window CW, the pressure applied to the cover window CW during molding may be relatively large because the thickness tm of the cover window member CWm is greater than the thickness t0 of the cover window CW according to the embodiment.

The pressure applied to the cover window CW and the temperature during the molding increase, surface quality of the cover window CW may degrade. To complement this, according to an embodiment, in a polishing process performed after molding the cover window CW, a polishing time and a polishing pressure may be appropriately increased.

Referring to FIG. 11C, the second mold 1400 may be moved away from the first mold 1300 by the moving portion 1500 (see FIG. 8).

According to one or more embodiments as described above, in case that the display panel 10 is attached to the inner surface of the cover window CW, the stress applied to the display panel 10 may be reduced. Damage to the display panel 10 may be reduced and the yield may be improved.

The cover window, the display device including the cover window, and the apparatus for manufacturing a display device are described, but one or more embodiments are not limited thereto. For example, a method of manufacturing the cover window and a method of manufacturing the display device including the cover window may be also included in the scope of the disclosure.

According to the embodiment as described above, the cover window providing the user with excellent grip sense in case that the user contacts the display device, the display device including the cover window, and the apparatus for manufacturing a display device may be implemented.

Also, in case that a display area of a display panel may include a curved surface that is curved in various directions and with various radii of curvature, a cover window with which stress applied to the display panel is reduced in case that the display panel is attached to the cover window and damage to the display panel is reduced, a display device including the cover window, and an apparatus for manufacturing the display device may be implemented. However, the scope of one or more embodiments is not limited to the above effects.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A display device comprising:
a display panel including a display area including light-emitting devices; and
a cover window disposed on the display panel, wherein the cover window comprises:
a front portion including a flat surface;
a first side portion extending from a first edge of the front portion, the first side portion being bent about a first axis that is parallel to the first edge of the front portion;
a second side portion extending from a second edge crossing the first edge of the front portion, the second side portion being bent about a second axis that is parallel to the second edge of the front portion; and
a corner portion between the first side portion to the second side portion,
the first side portion, the second side portion and the corner portion of the cover window each include an inner surface facing the display panel and an outer surface opposite to the inner surface,
the outer surface of the first side portion comprises a first outer curvature radius and the inner surface of the first side portion comprises a first inner curvature radius different from the first outer curvature radius, the first outer curvature radius extending from a first outer surface axis parallel to the first axis and the first inner curvature radius extending from a first inner surface axis parallel to the first axis, the first inner curvature radius overlapping the first outer surface axis in the first inner surface axis direction,
the outer surface of the second side portion comprises a second outer curvature radius and the inner surface of the second side portion comprises a second inner curvature radius different from the second outer curvature radius, the second outer curvature radius extending from a second outer surface axis parallel to the second axis and the second inner curvature radius extending from a second inner surface axis parallel to the second axis, the second inner curvature radius overlapping the second outer surface axis in the second inner surface axis direction, and the outer surface of the corner portion comprises a third outer curvature radius and the inner surface of the corner side portion comprises a third inner curvature radius different from the third outer curvature radius, the third outer curvature radius extending from a third outer surface axis intersecting the first axis and the second axis and the third inner curvature radius extending from a third inner surface axis parallel to the third outer surface axis, the third inner curvature radius overlapping the third outer surface axis in the second inner surface axis direction.

2. The display device of claim 1, wherein at least one of the first outer curvature radius of the outer surface of the first side portion and the second outer curvature radius of the outer surface of the second side portion is less than at least one of the first inner curvature radius of the inner surface of the first side portion and the second inner curvature radius of the inner surface of the second side portion.

3. The display device of claim 2, wherein the display panel comprises:
a front display area corresponding to the front portion of the cover window;
a first side display area and a second side display area respectively corresponding to the first side portion and the second side portion of the cover window; and
a corner display area corresponding to the corner portion of the cover window.

4. The display device of claim 3, wherein the display panel comprises:
a first portion bent along the inner surface of the first side portion of the cover window; and
a second portion bent along the inner surface of the second side portion of the cover window.

5. The display device of claim 4, wherein a surface of the first portion in the display panel has a curvature radius same as the curvature radius of the inner surface of the first side portion in the cover window, and
a surface of the second portion in the display panel has a curvature radius same as the curvature radius of the inner surface of the second side portion in the cover window.

6. The display device of claim 1, wherein a thickness of the first side portion varies in a direction away from the first edge of the front portion.

7. The display device of claim 6, wherein the thickness of the first side portion is gradually increased and reduced in the direction away from the first edge of the front portion.

8. The display device of claim 1, wherein a maximum thickness of the first side portion in the cover window is greater than a thickness of the front portion.

9. A display device comprising:
a display panel including a display area including light-emitting devices; and
a cover window disposed on the display panel,
wherein the cover window comprises:
a front portion including a flat surface;
a first side portion extending from a first edge of the front portion, the first side portion being bent about a first axis that is parallel to the first edge of the front portion;
a second side portion extending from a second edge crossing the first edge of the front portion, the second side portion being bent about a second axis that is parallel to the second edge of the front portion; and a corner portion between the first side portion to the second side portion, a thickness of the first side portion of the cover window varies in a direction away from the first edge of the front portion, and a thickness of the second side portion of the cover window varies in a direction away from the second edge of the front portion;

an outer surface of the first side portion comprises a first outer curvature radius and an inner surface of the first side portion comprises a first inner curvature radius different from the first outer curvature radius, the first outer curvature radius extending from a first outer surface axis parallel to the first axis and the first inner curvature radius extending from a first inner surface axis parallel to the first axis, the first inner curvature radius overlapping the first outer surface axis in the first inner surface axis direction, an outer surface of the second side portion comprises a second outer curvature radius and an inner surface of the second side portion comprises a second inner curvature radius different from the second outer curvature radius, the second outer curvature radius extending from a second outer surface axis parallel to the second axis and the second inner curvature radius extending from a second inner surface axis parallel to the second axis, the second inner curvature radius overlapping the second outer surface axis in the second inner surface axis direction, and an outer surface of the corner portion comprises a third outer curvature radius and an inner surface of the corner side portion comprises a third inner curvature radius different from the third outer curvature radius, the third outer curvature radius extending from a third outer surface axis intersecting the first axis and the second axis and the third inner curvature radius extending from a third inner surface axis parallel to the third outer surface axis, the third inner curvature radius overlapping the third outer surface axis in the second inner surface axis direction.

10. The display device of claim 9, wherein the thickness of the first side portion of the cover window is gradually increased and reduced in the direction away from the first edge of the front portion, and the thickness of the second side portion of the cover window is gradually increased and reduced in the direction away from the second edge of the front portion.

11. The display device of claim 9, wherein a maximum thickness of each of the first side portion and the second side portion in the cover window is greater than a thickness of the front portion.

12. The display device of claim 1, wherein the first inner curvature radius overlaps the first outer surface axis based on the first outer surface axis being disposed within a first virtual circle defined by the first inner curvature radius about the first inner surface axis;

the second inner curvature radius overlaps the second outer surface axis based on the second outer surface axis being disposed within a second virtual circle defined by the second inner curvature radius about the second inner surface axis;

the third inner curvature radius overlaps the third outer surface axis based on the third outer surface axis being disposed within a third virtual circle defined by the third inner curvature radius about the third inner surface axis.

\* \* \* \* \*